(12) United States Patent
Downie et al.

(10) Patent No.: US 11,668,157 B2
(45) Date of Patent: Jun. 6, 2023

(54) LOCKING CLAMP FOR A ROTATING CONTROL DEVICE

(71) Applicant: Reform Energy Services Corp., Leduc (CA)

(72) Inventors: Ronald James Downie, Leduc (CA); Joel Victor-David Dunbar, Leduc (CA)

(73) Assignee: Reform Energy Services Corp., Alberta (CA)

( * ) Notice: Subject to any disclaimer, the term of this patent is extended or adjusted under 35 U.S.C. 154(b) by 0 days.

(21) Appl. No.: 17/974,372

(22) Filed: Oct. 26, 2022

(65) Prior Publication Data

US 2023/0039966 A1 Feb. 9, 2023

Related U.S. Application Data

(62) Division of application No. 17/050,407, filed as application No. PCT/CA2019/050538 on Apr. 25, 2019, now Pat. No. 11,525,324.

(60) Provisional application No. 62/666,221, filed on May 3, 2018.

(51) Int. Cl.
*E21B 33/08* (2006.01)
*E21B 17/02* (2006.01)

(52) U.S. Cl.
CPC ............ *E21B 33/085* (2013.01); *E21B 17/02* (2013.01)

(58) Field of Classification Search
CPC ....... E21B 33/08; E21B 33/085; E21B 33/086
See application file for complete search history.

(56) References Cited

U.S. PATENT DOCUMENTS

| | | | |
|---|---|---|---|
| 7,926,593 B2 | 4/2011 | Bailey et al. | |
| 9,163,473 B2 | 10/2015 | Linde et al. | |
| 9,260,934 B2 | 2/2016 | Godfrey et al. | |
| 2007/0228753 A1 | 10/2007 | Dugal et al. | |
| 2015/0204147 A1 | 7/2015 | Netecke et al. | |
| 2016/0024871 A1 | 1/2016 | Linde et al. | |
| 2017/0051785 A1 | 2/2017 | Cooper | |
| 2017/0114602 A1 | 4/2017 | Grace | |
| 2019/0024474 A1 | 1/2019 | Chau et al. | |

FOREIGN PATENT DOCUMENTS

WO 2016099456 A1 6/2016

OTHER PUBLICATIONS

International Search Report and Written Opinion for PCT/CA2019/050538 dated Jul. 8, 2019, 10 pages.

*Primary Examiner* — Kristyn A Hall
(74) *Attorney, Agent, or Firm* — Suiter Swantz pc llo

(57) ABSTRACT

A clamp assembly device for connecting a rotating control device bearing assembly to a main body of a rotating control device. The device includes clamp members configured to retain the bearing assembly in place on the main body, a clamp actuator for driving clamping and unclamping of the clamp members and a lock pin controlled by a lock pin actuator. The lock pin actuator is configured to lock and unlock the clamp assembly device by moving the pin between locked and unlocked positions along an axis substantially parallel with the axis of rotation of the bearing assembly.

9 Claims, 26 Drawing Sheets

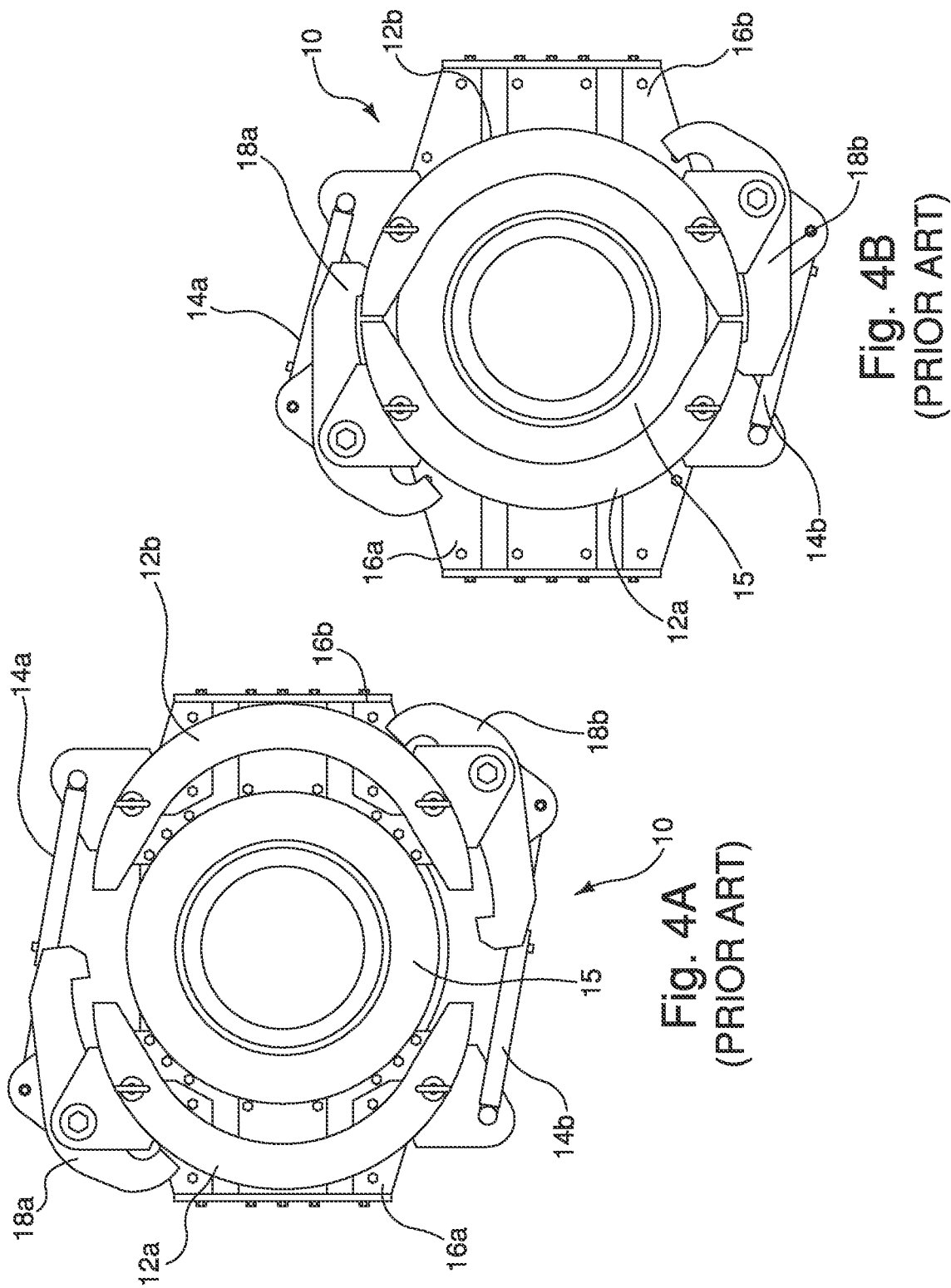

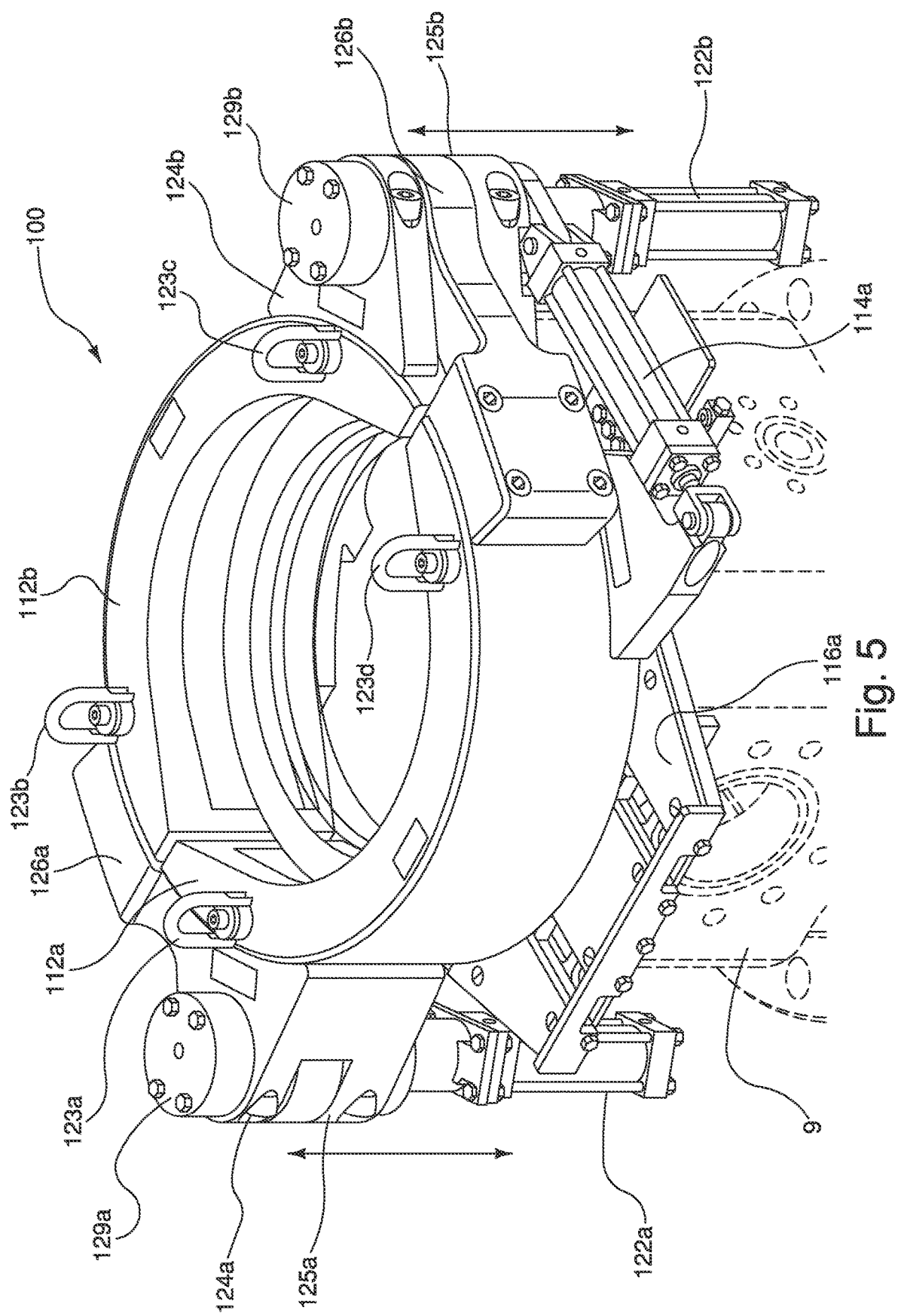

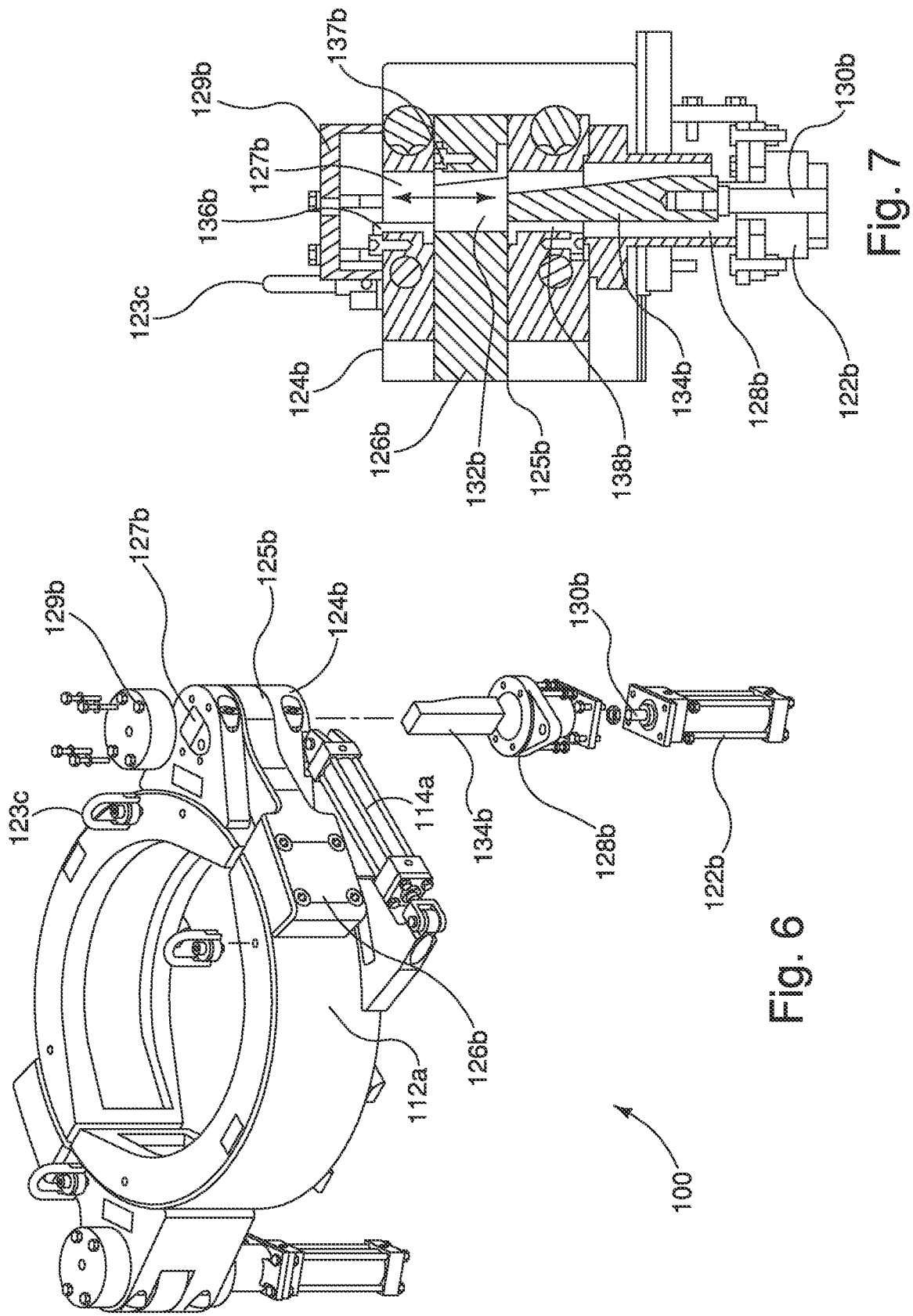

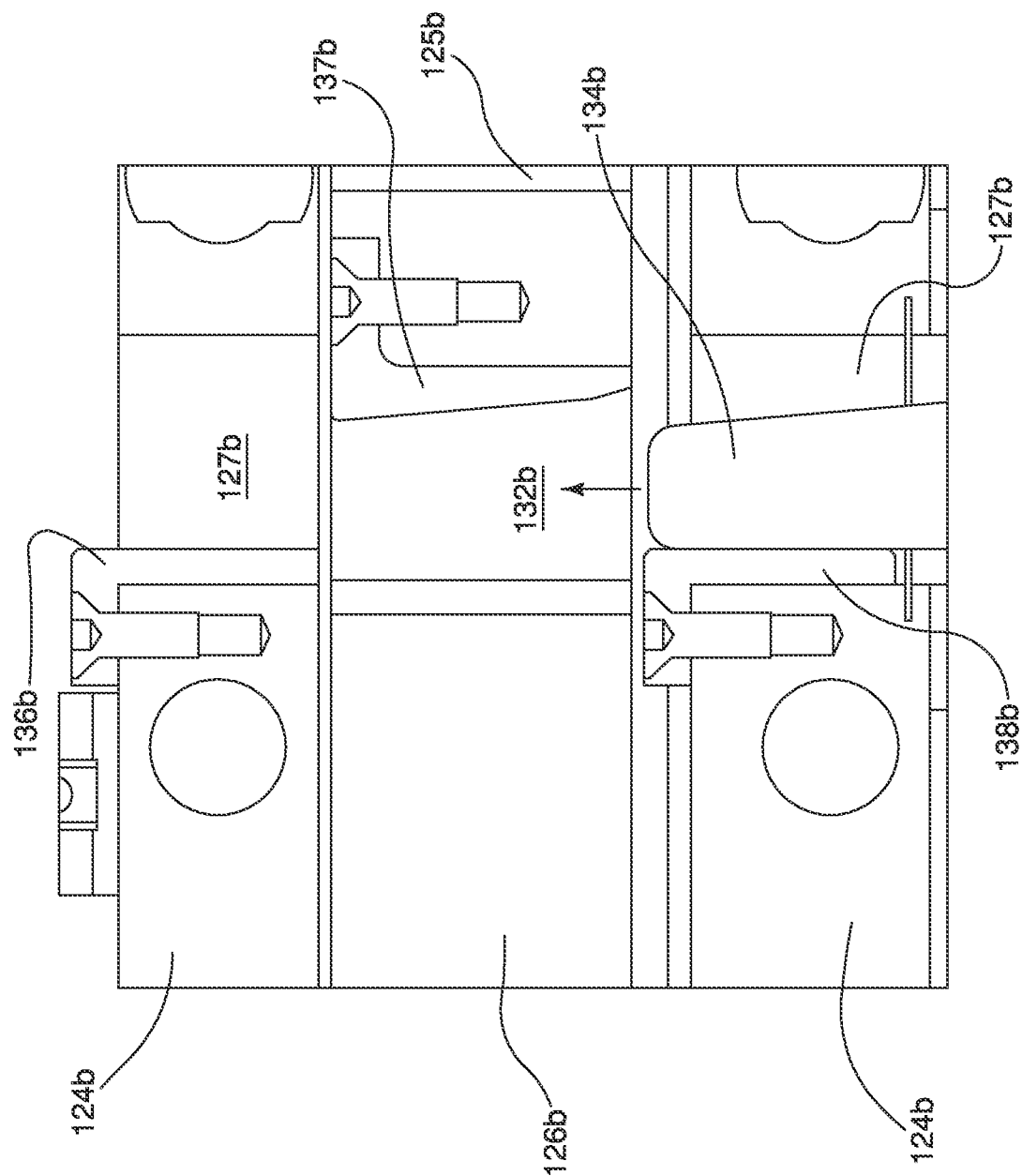

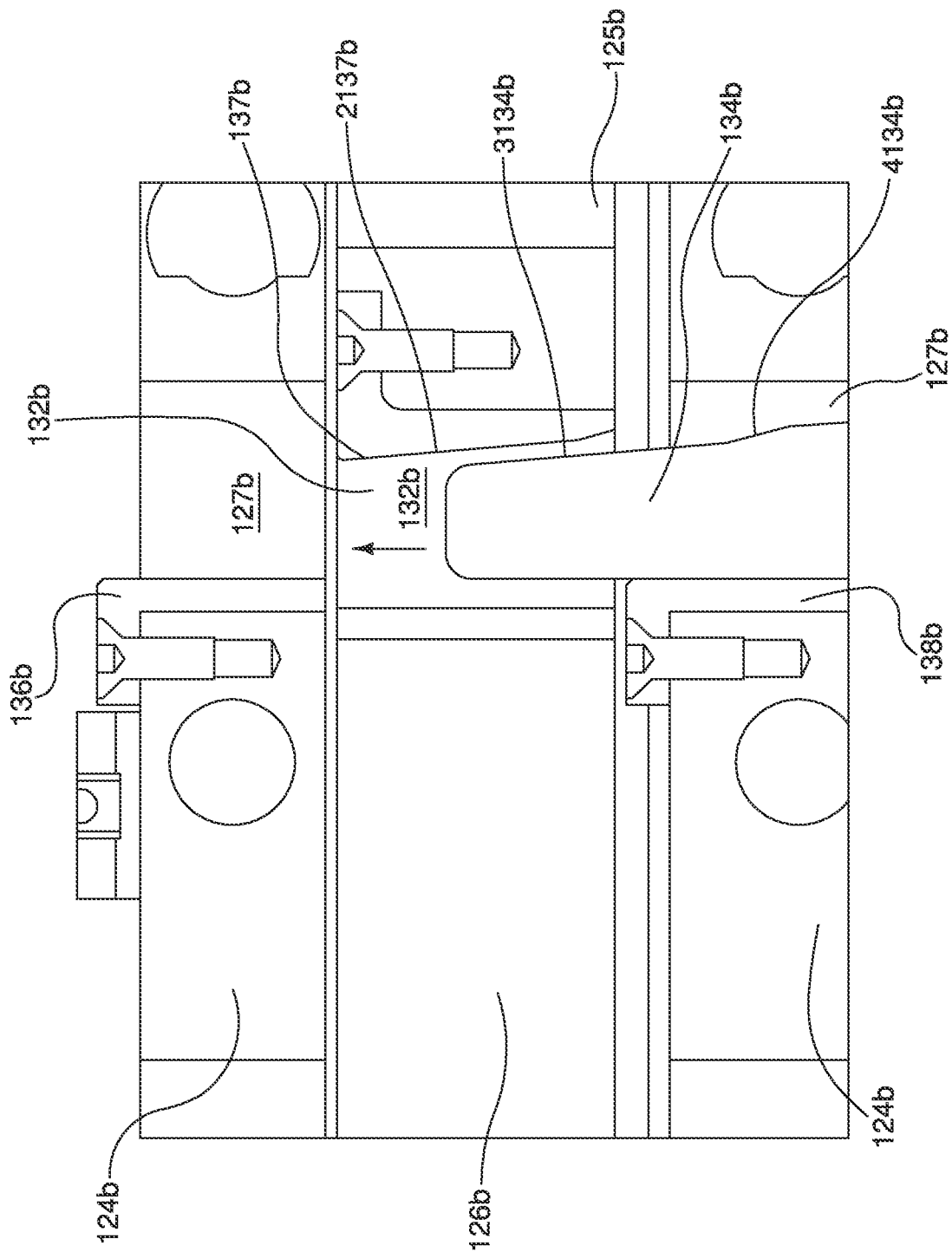

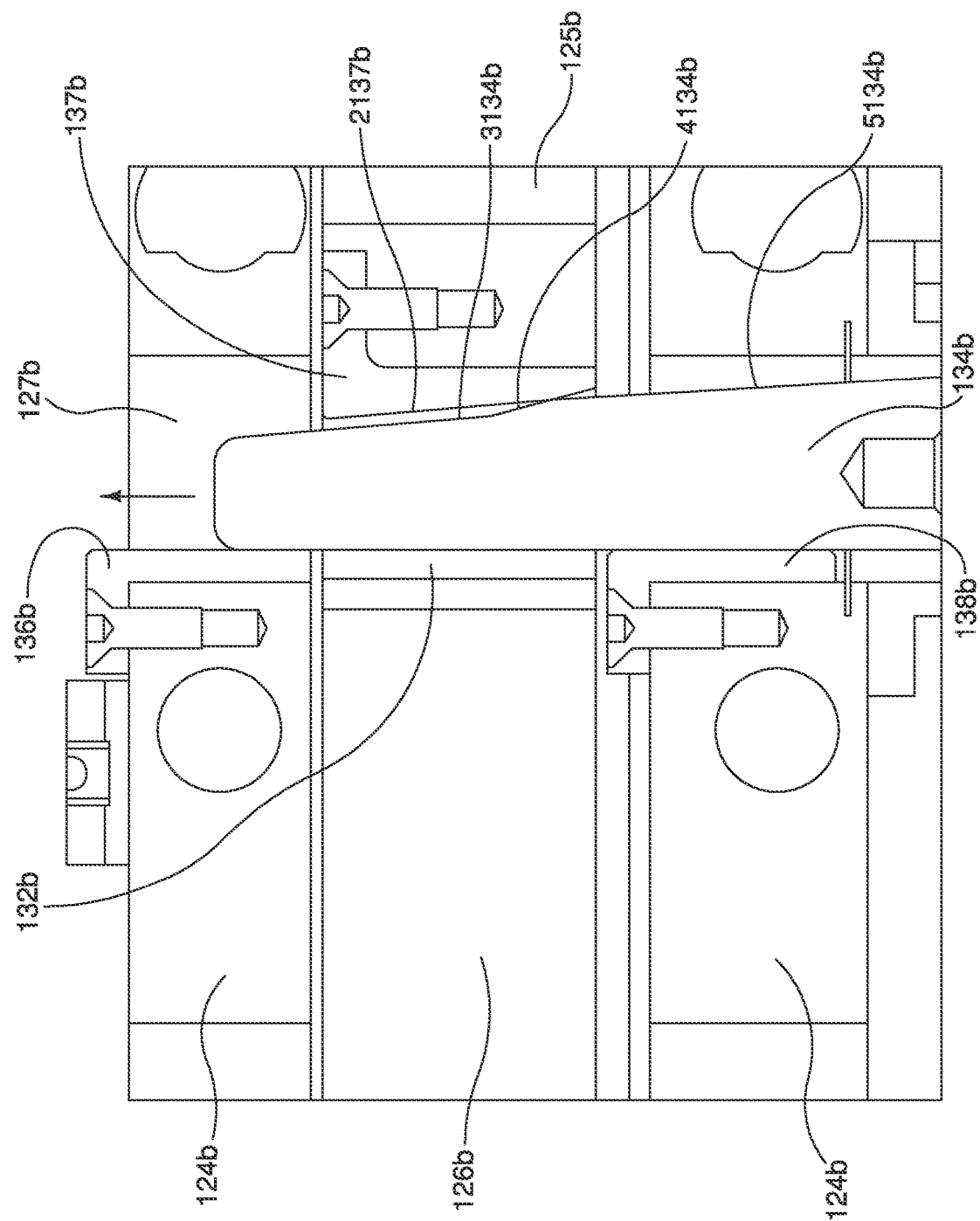

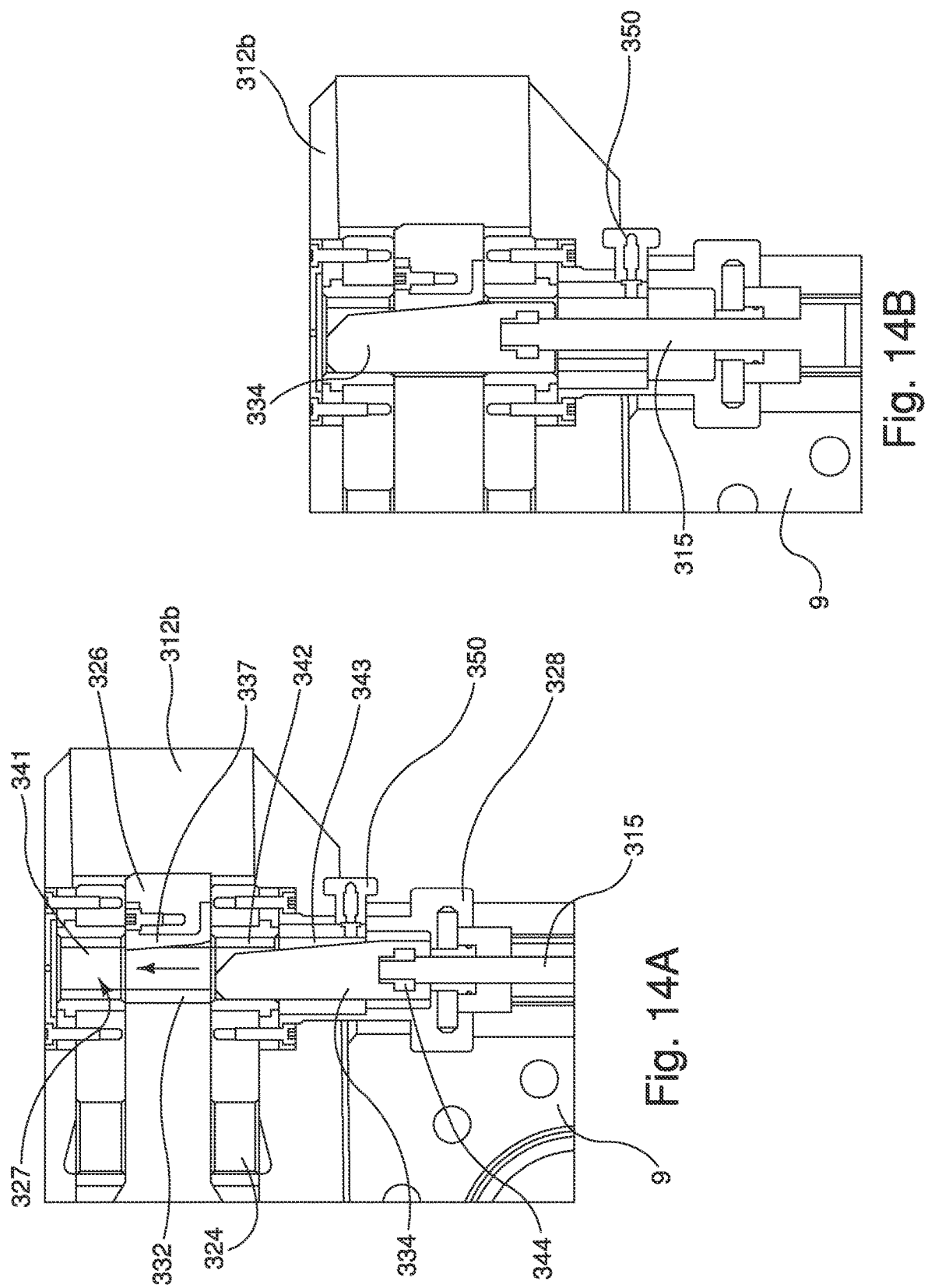

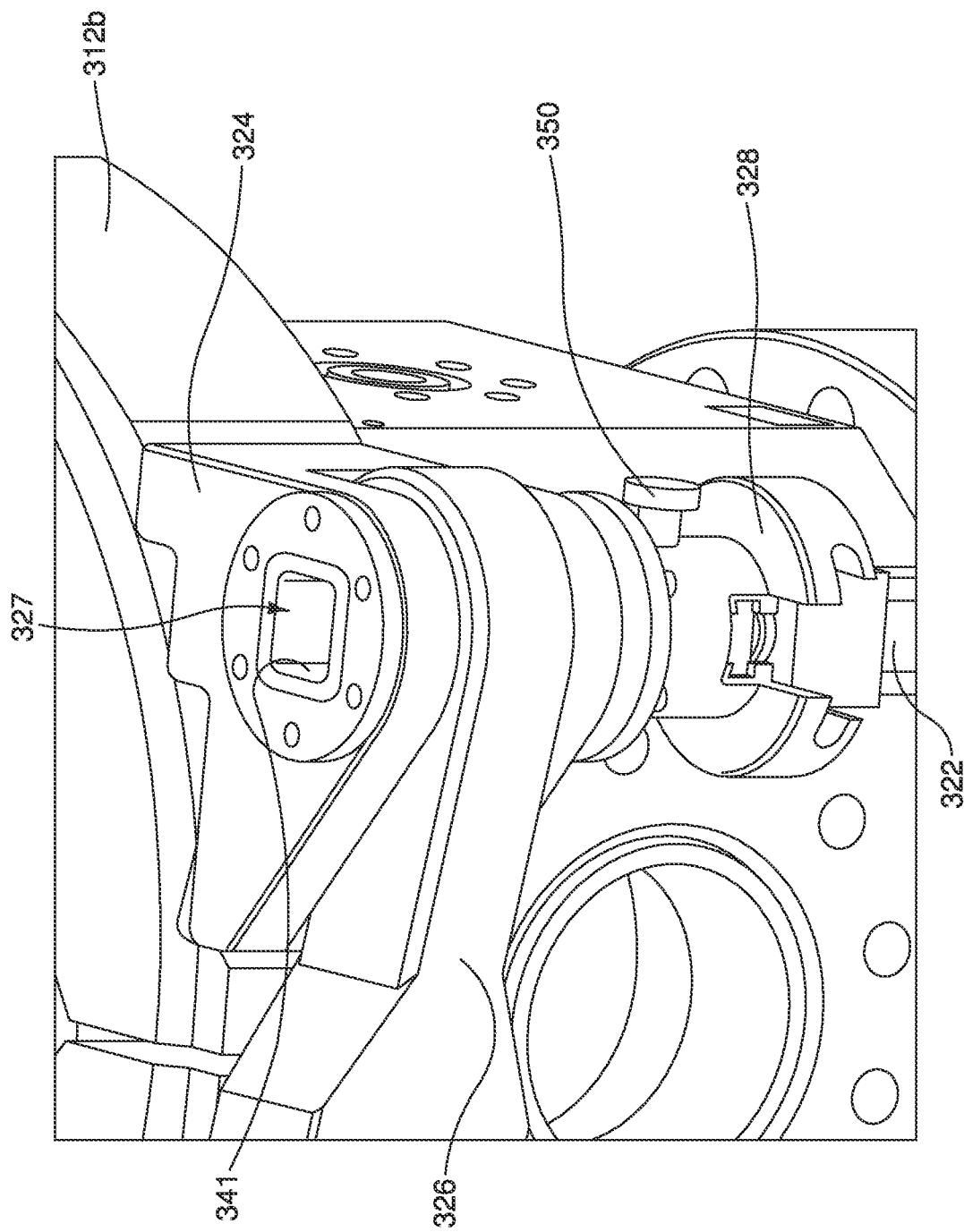

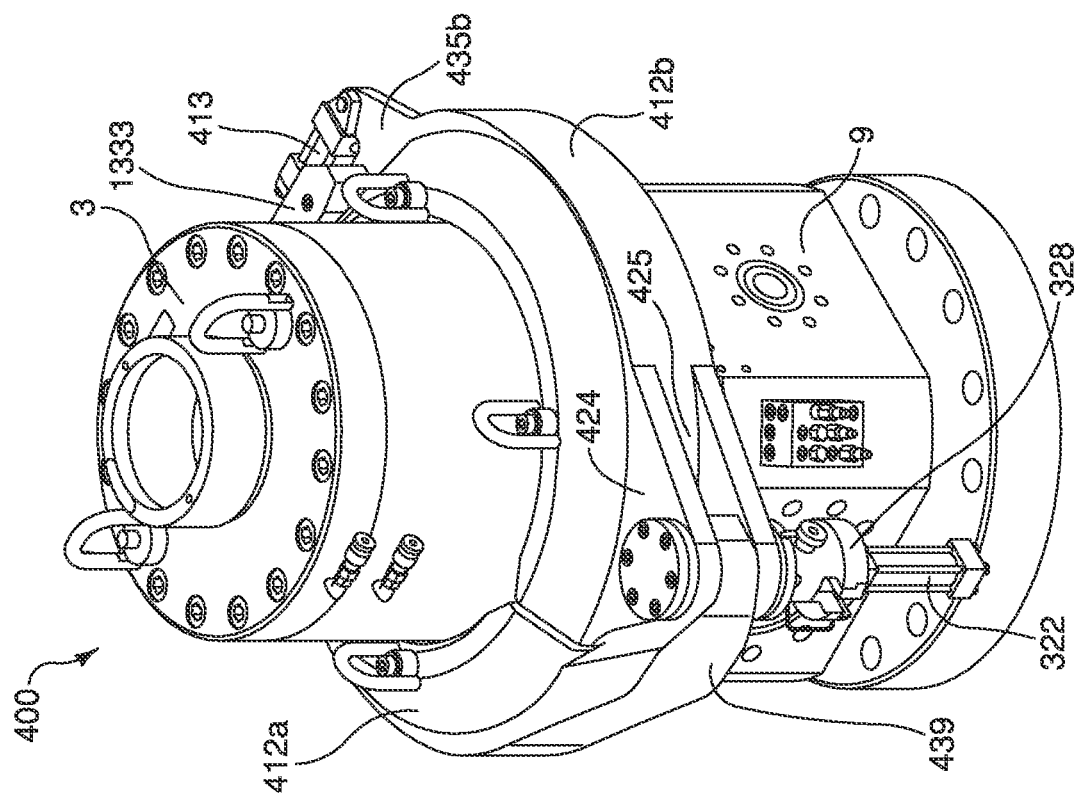
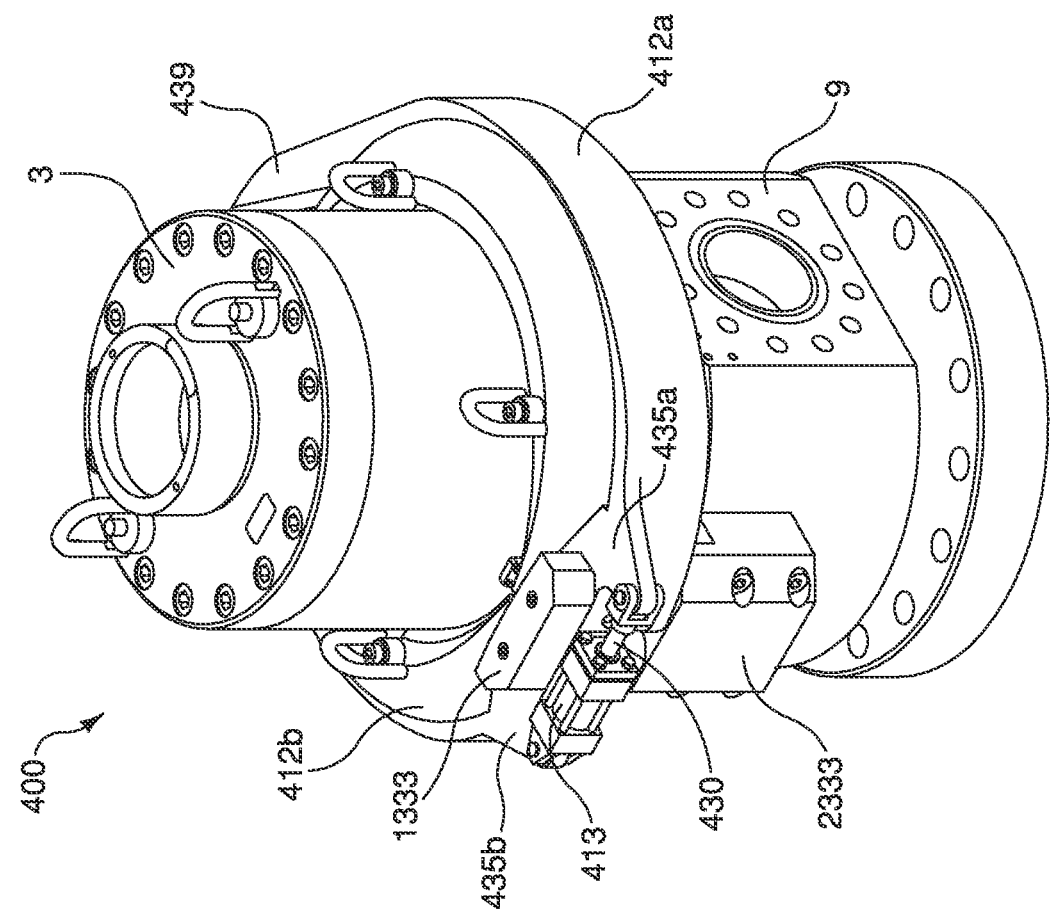

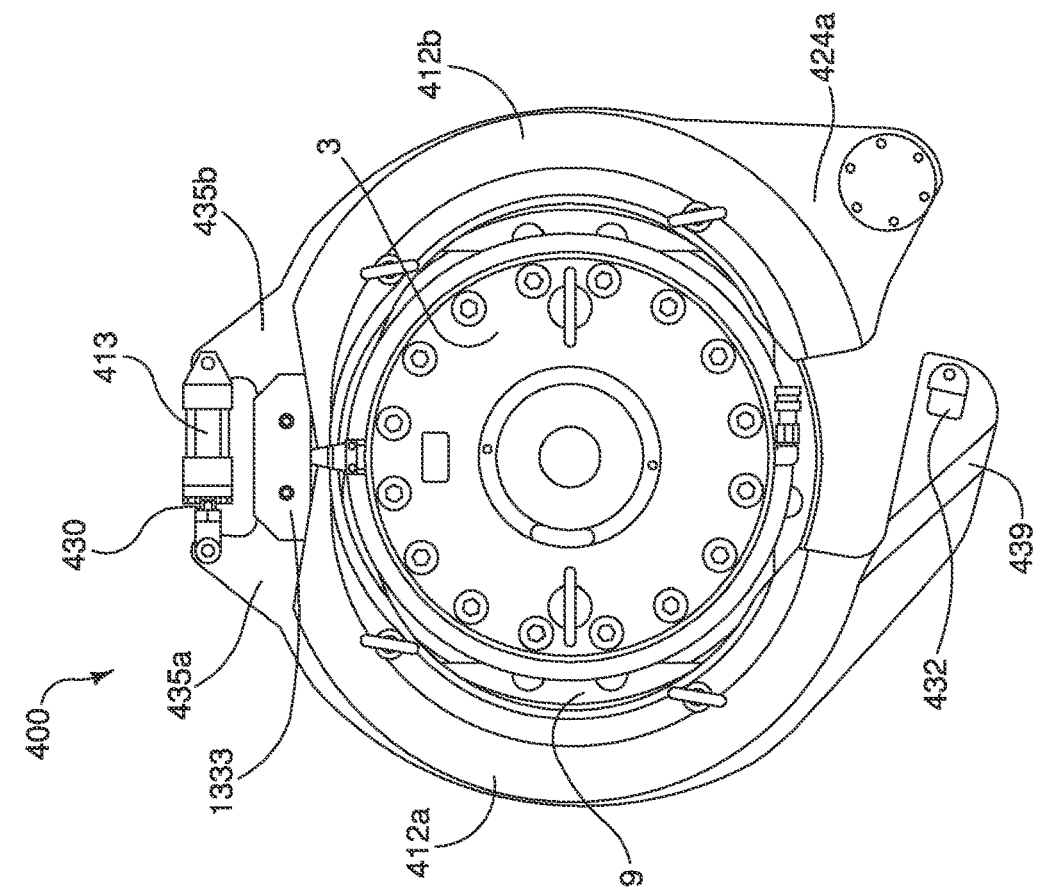
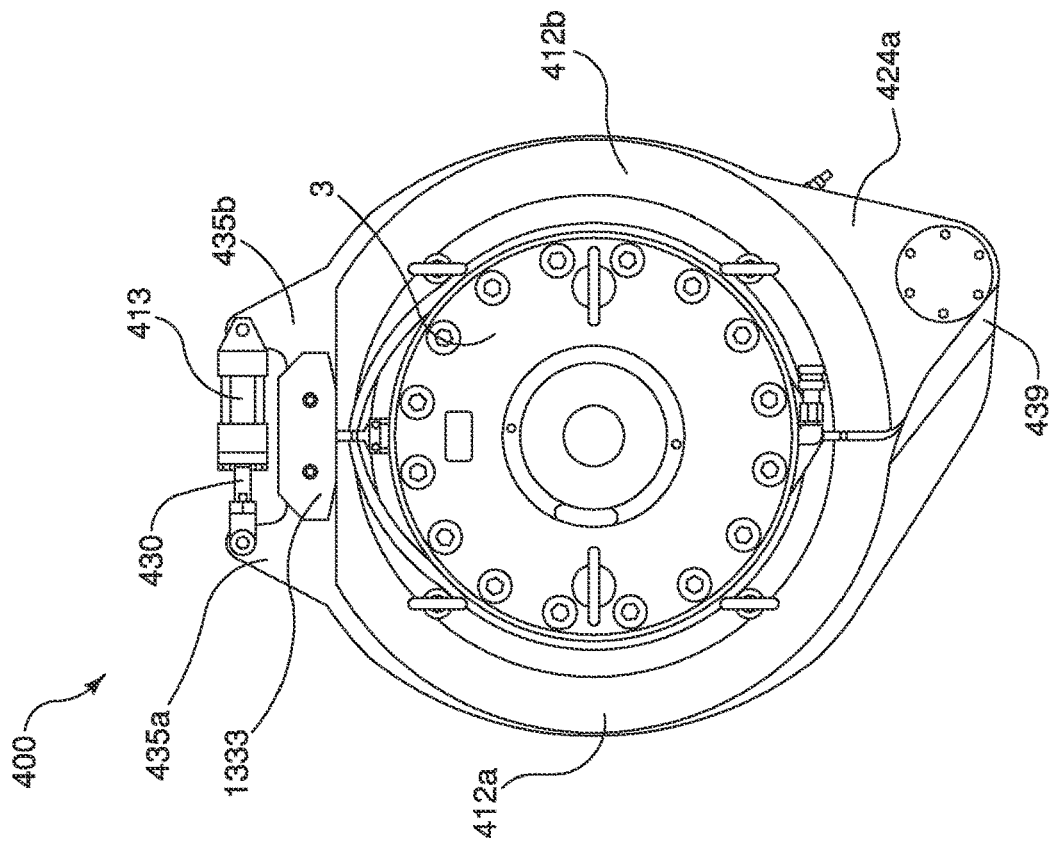

LOCKING CLAMP FOR A ROTATING CONTROL DEVICE

CROSS-REFERENCE TO RELATED APPLICATIONS

The present application is a divisional of and claims the benefit of U.S. patent application Ser. No. 17/050,407, filed on Oct. 23, 2020, which claims the benefit of and is a 371 National Stage Application of PCT/CA19/50538, filed on Apr. 25, 2019, which claims the benefit of U.S. Provisional Application 62/666,221, filed on May 3, 2018, whereby each of the above-listed applications is incorporated herein by reference in the entirety.

FIELD OF THE INVENTION

The invention relates to wellhead components used in drilling of oil and gas wells and more particularly to making a connection between components of a rotating control device.

BACKGROUND

During oilfield drilling operations, the control of pressures and flows to and from and within the well bore are critical to maintaining a safe drilling environment particularly around the drilling platform and wellhead. Two critical devices operating on a wellhead during drilling are the blowout preventer (BOP) stack and a rotating control device (RCD). Both of these devices control pressures and flows to and from the well during drilling and particularly during events such as well kicks and loss of circulation of drilling fluids and gases.

The rotating control device provides a sealed connection between the fixed non-rotating BOP stack and any rotating components above or passing through the BOP stack. Generally, the RCD also functions to provide safe fluid containment and diversion of returning drilling fluids and cuttings away from the drill floor during drilling.

The RCD includes a non-rotating main body which connects to the BOP stack or an upper extension thereof and a bearing assembly which includes a rotating portion that passes through the main body and grips the drill string with an elastomeric sealing element.

The connection between the main body of the RCD and the bearing assembly is typically accomplished by using a high pressure clamping assembly.

The clamping assembly will typically engage with corresponding clamping surfaces on both the main body of the RCD and the bearing assembly of the RCD to secure one to the other.

SUMMARY

One aspect of the invention is a clamp assembly device for connecting a rotating control device bearing assembly to a main body of a rotating control device. The device comprises clamp members configured to retain the bearing assembly in place on the main body, a clamp actuator for driving clamping and unclamping of the clamp members and lock pin controlled by a lock pin actuator. The lock pin actuator is configured to lock and unlock the clamp assembly device by moving the pin between locked and unlocked positions along an axis substantially parallel with the axis of rotation of the bearing assembly.

The clamp actuator may be provided as a clamping hydraulic cylinder acting to move the clamp members together to a clamped position and to move the clamp members apart to an open position.

The clamping hydraulic cylinder may be connected between a pair of extensions from adjacent ends of the clamping members. This embodiment may be arranged such that extending of the clamping hydraulic cylinder acts to move the clamp members together to the clamped position with retracting of the clamping hydraulic cylinder acting to move the clamp members apart to an open position.

In some embodiments, a hinge is connected between the adjacent ends of the clamping members medial to the clamping hydraulic cylinder. The hinge may be connected between the main body and the first and second clamping members, thereby holding the device in place when in the open position.

The lock pin actuator may be a locking hydraulic cylinder associated with a first clamp member of the clamp members. In this embodiment, the locking hydraulic cylinder is configured to move the lock pin into and out of generally aligned bores of the clamp members. In some embodiments, moving the lock pin into the generally aligned bores provides the locked position and moving the lock pin out of the generally aligned bores provides the unlocked position.

In some embodiments, the locking hydraulic cylinder may be connected to a lug on the first clamp member and a second clamp member of the clamp members provides an arm configured to enter a channel of the lug to align a pair of lug bores with a bore of the arm, wherein, when the clamp members are in the clamped position, the bore of the arm and the pair of lug bores provide the generally aligned bores.

The clamp actuator and the lock pin actuator may be spaced apart from each other. In one embodiment, the clamp actuator and the lock pin actuator are located on substantially opposing sides of the device.

The locking hydraulic cylinder may be connected to the lug by a lock pin housing which has a housing bore aligned with the pair of lug bores.

The lock pin may have a tapered surface which engages with a complementary tapered surface of a wear insert in the bore of the arm to drive the arm to further align the generally aligned lock bores to provide mechanical locking of the device.

An upper bore of the pair of lug bores may be provided with an upper wear insert.

The housing bore may be circular and provided with a housing wear insert which is rotatable within the housing bore, the housing wear insert having a non-circular shaped lock pin bore formed therein which, when rotated from a normal position, prevents entry of the lock pin into the non-circular shaped lock pin bore from above the housing wear insert.

The lock pin housing may have a lateral slot, In this embodiment, the housing wear insert has a secondary lock member connected thereto and extending outward from the lateral slot to provide a mechanism for rotating the housing wear insert when the lock pin is extended upward outside of the housing wear insert, thereby moving the non-circular shaped lock pin bore out of alignment with the first and second locking member bores, thereby preventing the lock pin from dropping into the non-circular shaped lock pin bore and providing a secondary lock mechanism. In some embodiments the ends of the lateral slot each have an enlarged radius to prevent the secondary lock member from sliding in the slot when the secondary lock member drops into a lower portion of the enlarged radius.

In some embodiments, the non-circular shaped lock pin bore is deviated from the center of the housing wear insert to provide different distances between the center of the locking bore and each of the sides of the locking bore, thereby providing an adjustment mechanism to overcome minor deformations of the sides of the locking bore or minor deformations of the lock pin, the adjustment mechanism controlled by removing, reorienting and replacing the housing wear insert.

In some embodiments the device further comprises a lock pin position sensor configured to provide a visual indicator to an operator when the locking actuator is in the locked position.

In some embodiments, the locking actuator is removable, thereby allowing replacement of the lock pin.

In some embodiments, the clamping actuator and the lock pin actuator are located substantially on the same side of the clamping assembly as the locking hydraulic cylinder and a hinge is located between two ends of the clamp members substantially on the opposite side of the device.

Another aspect of the invention is a hydraulic system for controlling the sequence of clamping, locking, unlocking and unclamping of the device described herein. The system includes: a hydraulic network having first and second ports, which is configured to pump hydraulic fluid into the network via the first port and direct the hydraulic fluid first to the clamping actuator to clamp the clamping members together and then to direct the hydraulic fluid to the locking actuator to lock the clamping members together. The hydraulic network is further configured to pump hydraulic fluid into the network via the second port and direct the hydraulic fluid first to the locking actuator to unlock the clamping members and then to the clamping actuator to unclamp the clamping members.

In some embodiments of the system, the direction of movement of the hydraulic fluid is controlled by one or more sequence valves within the hydraulic network.

The one or more sequence valves may include an unclamping sequence valve in the channel providing hydraulic fluid to the clamping actuator when the clamping members are being unclamped.

The one or more sequence valves may include a locking sequence valve in the channel providing hydraulic fluid to the locking hydraulic cylinder when clamping members are being locked.

The sequence valves may be arranged in parallel with each sequence valve having a bypass check valve for reverse flow.

The hydraulic network may include a clamping one-way valve to maintain clamping pressure on the clamping actuator.

The clamping one-way valve may be a pilot controlled one-way valve configured to allow counter-flow in response to pressure being applied to unclamp the clamping members.

The hydraulic network may include a locking one-way valve to maintain locking pressure on the locking actuator.

The locking one-way valve may be a pilot controlled one-way valve configured to allow counter-flow in response to pressure being applied to unlock the clamping members.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 4A is a top view of another clamp assembly 10 known in the prior art shown placed on top of the rim of the RCD main body 15. The clamp assembly 10 has its clamping cylinders 14a and 14b extended, placing the claim assembly 10 in the open position.

FIG. 4B is a top view of the same clamp assembly 10 of FIG. 4A shown with the clamping cylinders 14a and 14b retracted, placing the claim assembly 10 in the closed position.

FIG. 5 is a perspective view of a clamping assembly 100 according to a first embodiment of the invention.

FIG. 6 is a partially exploded view of the clamping assembly 100 indicating that the locking cylinder barrel 122b has a lock pin housing 128b attached thereto and a lock pin 134b which is driven by the locking cylinder rod 130b to lock the clamping assembly 100 in the closed position.

FIG. 7 is a cross sectional view of the clamp lug 124b and lock arm 126b indicating how the lock pin 134b extends through the lug bore 127b and the lock arm bore 132b to lock the clamp assembly 100 (indicated by the double arrow).

FIG. 8A is a cross-sectional view through the lug 124b and lock arm 126b showing a first position of the lock pin 134b as it moves upward as indicated by the arrow.

FIG. 8B is a cross-sectional view through the lug 124b and lock arm 126b showing a second position of the lock pin 134b as it moves upward into the lock arm bore 132b as indicated by the arrow.

FIG. 8D is a cross-sectional view through the lug 124b and lock arm 126b showing a fourth position of the lock pin 134b as it moves upward into the upper lug bore 127b indicated by the arrow.

Figure 12:
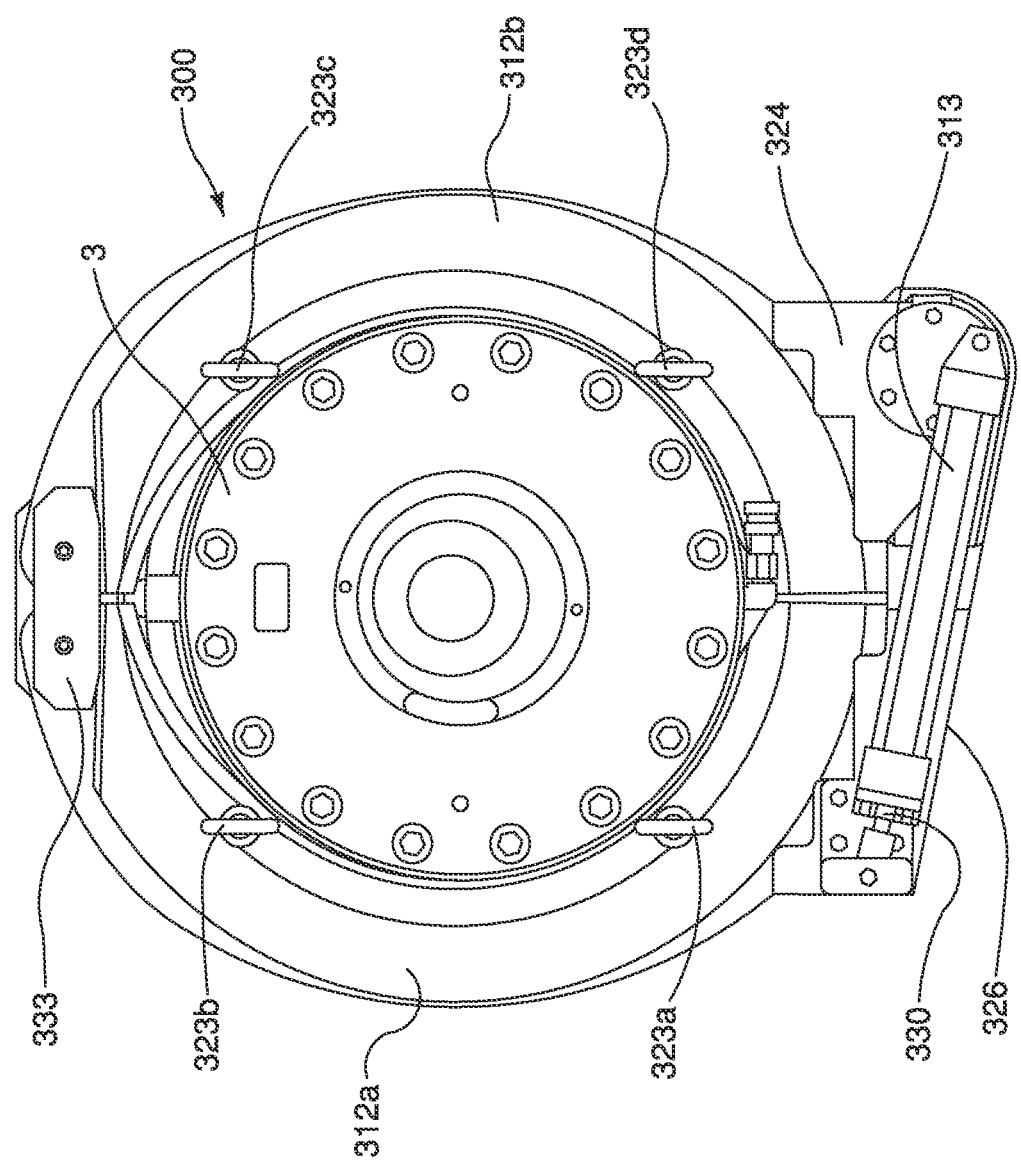

FIG. 12 is a top view of the clamp assembly 300 with clamp members 312a and 312b clamped together (closed position position) which clamps the RCD bearing assembly 3 to the RCD main body 9. The clamping cylinder rod 330 is retracted inside the clamping cylinder barrel 313.

Figure 13:
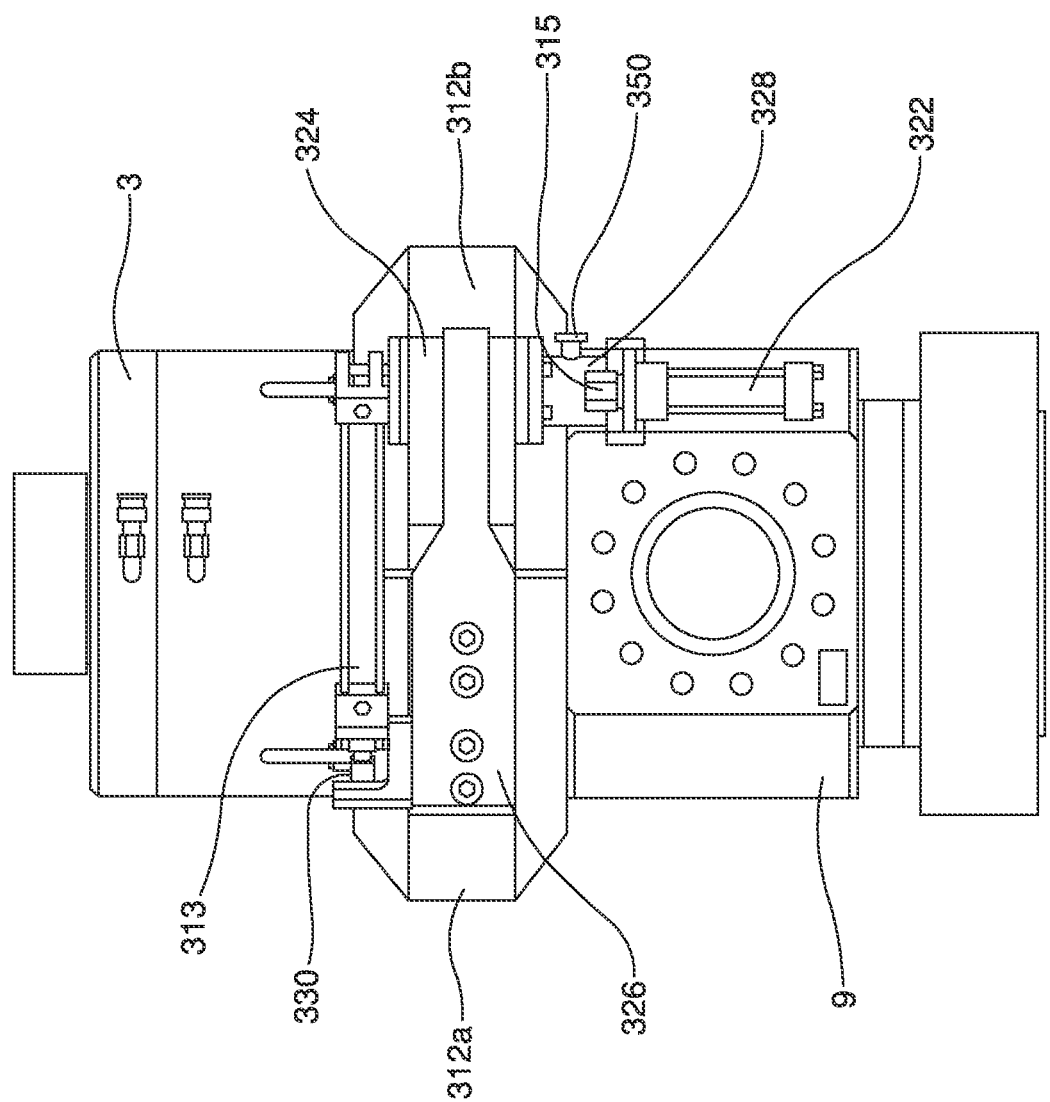

FIG. 13 is a side elevation view of the clamping assembly 300 in the closed position clamping the RCD bearing assembly 3 to the RCD main body 9.

FIG. 14A is a partial cross-sectional view of clamping and locking components of the clamping assembly 300 shown in the closed and unlocked position with the body of the lock pin 334 located below the lock arm bore 332.

FIG. 14B is a partial cross-sectional view of clamping and locking components of the clamping assembly 300 shown in the closed and locked position with the body of the lock pin 334 extending through the lock arm bore 332 and into the upper lug bore 327.

FIG. 15 is a perspective view of a portion of the clamping assembly 300 showing the upper lug bore 327 and wear insert 341 as well as the secondary lock member 350.

Figure 16:
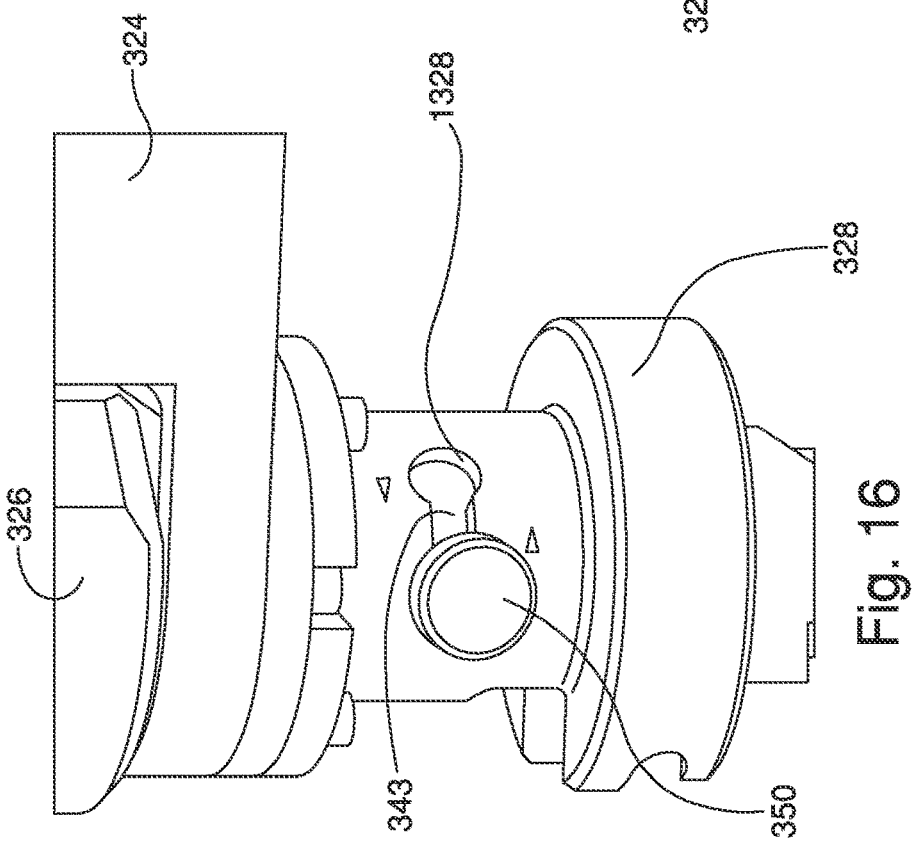

FIG. 16 is a perspective view of a portion of the clamping assembly 300 showing the secondary lock member 350 and slot 1328 for sliding the secondary lock member 350 to the left to a locked position.

Figure 17:
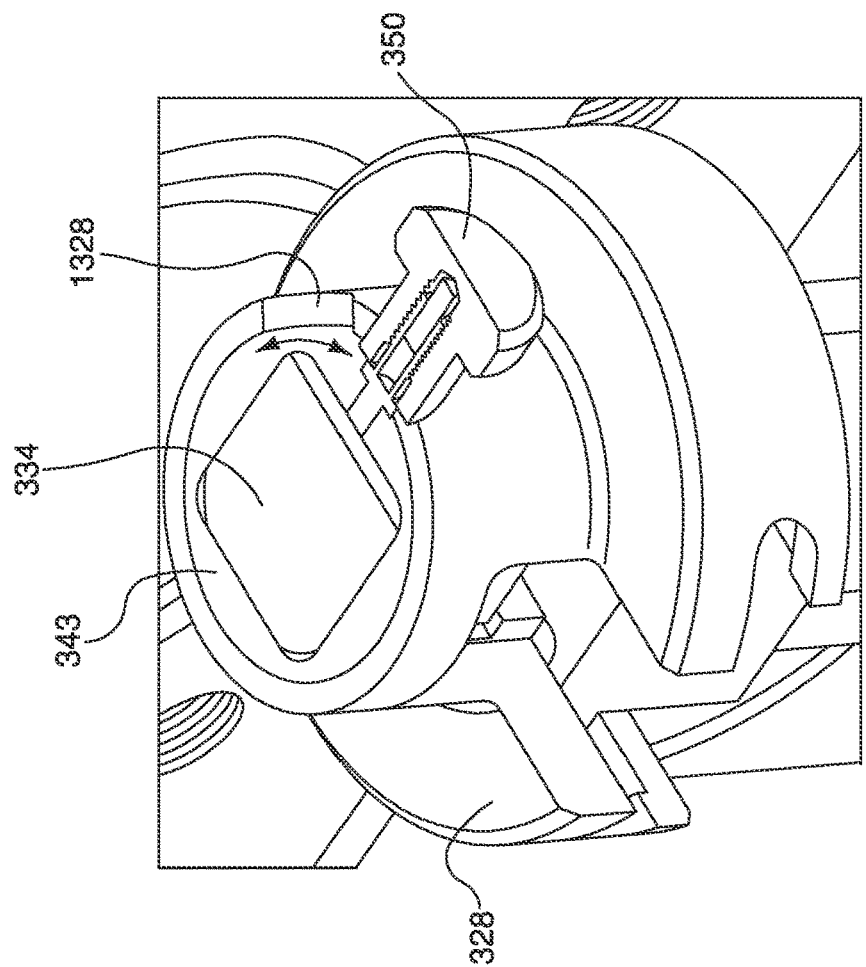

FIG. 17 is a cut-away perspective view of the lock pin housing 328 showing the secondary lock member 350 wear insert 343 and slot 1328 to indicate how shifting the position of the secondary lock member 350 will rotate the wear insert by 45 degrees when the bottom of the lock pin 334 is located above the wear insert 343 as shown in FIG. 14B. When the secondary lock member 350 is in the rotated and locked position, the orientation of the wear insert 343 prevents the lock pin 334 from dropping downward from the lock arm bore 332.

FIG. 18A is a perspective view of another embodiment of a clamp assembly 400 in the clamped and locked position.

FIG. 18B is a perspective view of clamp assembly 400 in the clamped and locked position which is rotated by about 180 degrees about its vertical axis relative to the perspective shown in FIG. 18A.

Figure 19B:
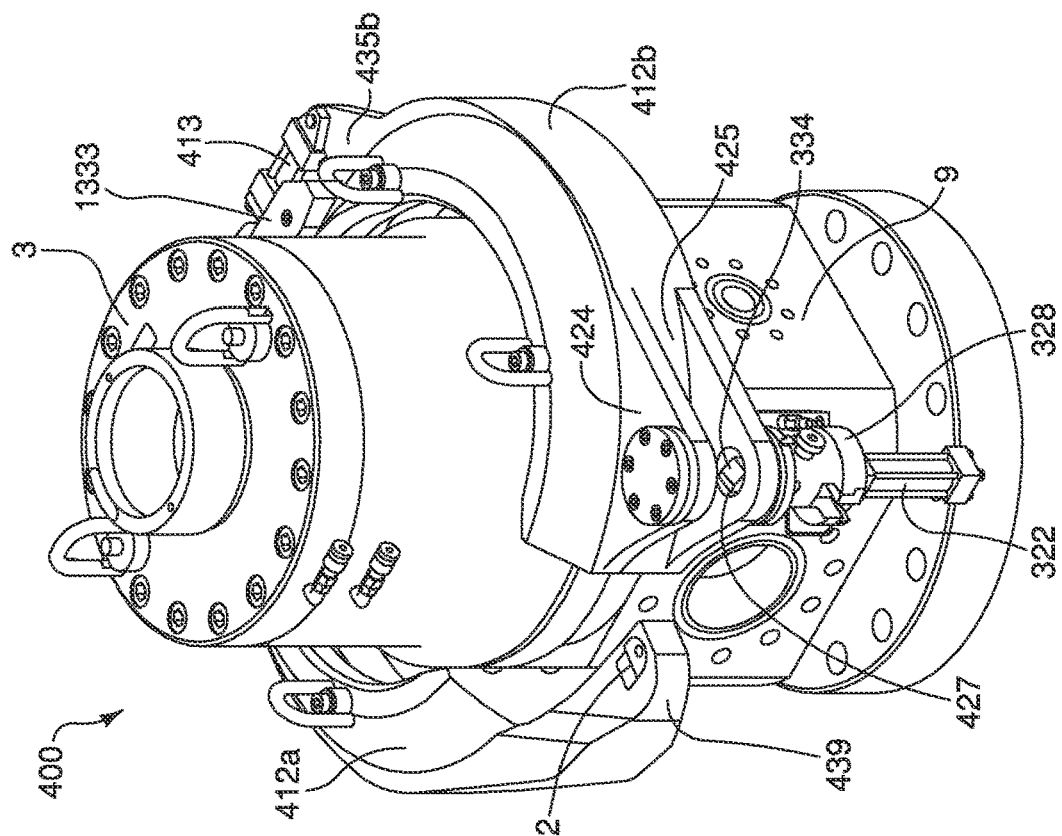
Figure 19A:
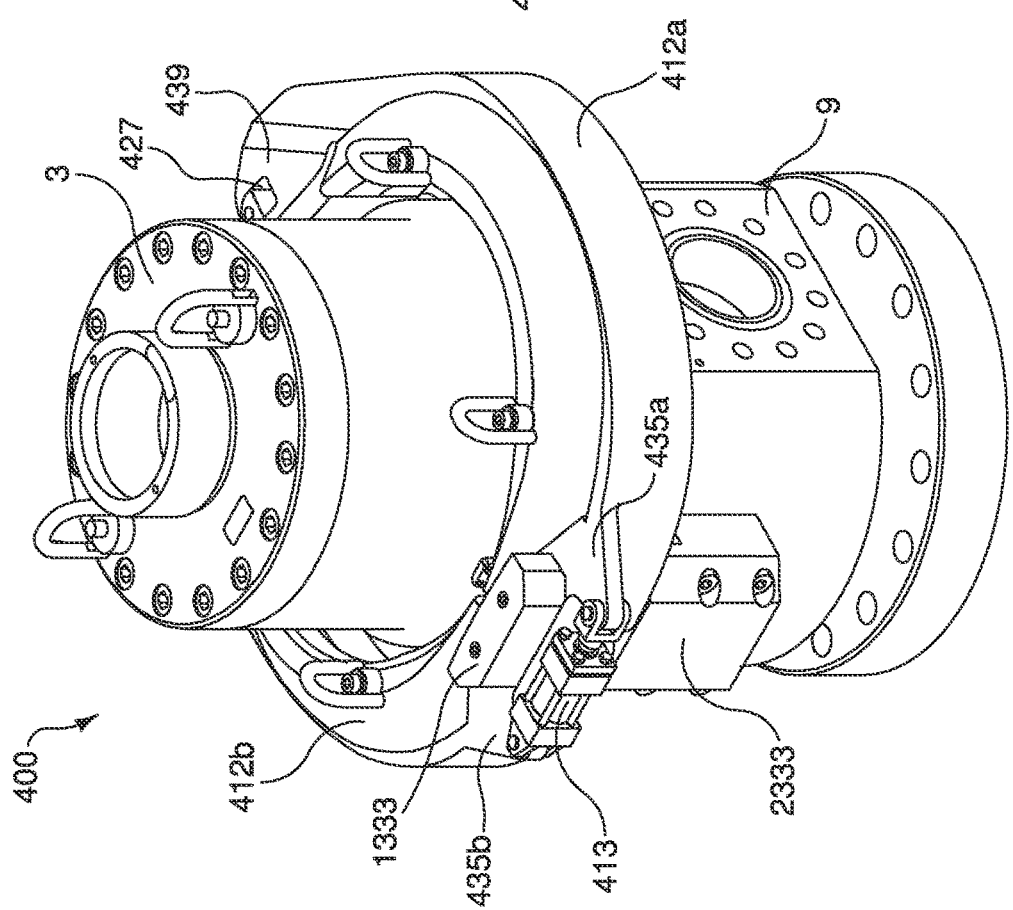

FIG. 19A is a perspective view of clamp assembly 400 in unclamped and open position.

FIG. 19B is a perspective view of clamp assembly 400 in the unclamped and open position which is rotated by about 180 degrees about its vertical axis relative to the perspective shown in FIG. 19A.

FIG. 20A is a top view of clamp assembly 400 in the clamped and locked position.

FIG. 20B is a top view of clamp assembly 400 in the unclamped and open position.

Figure 21A:
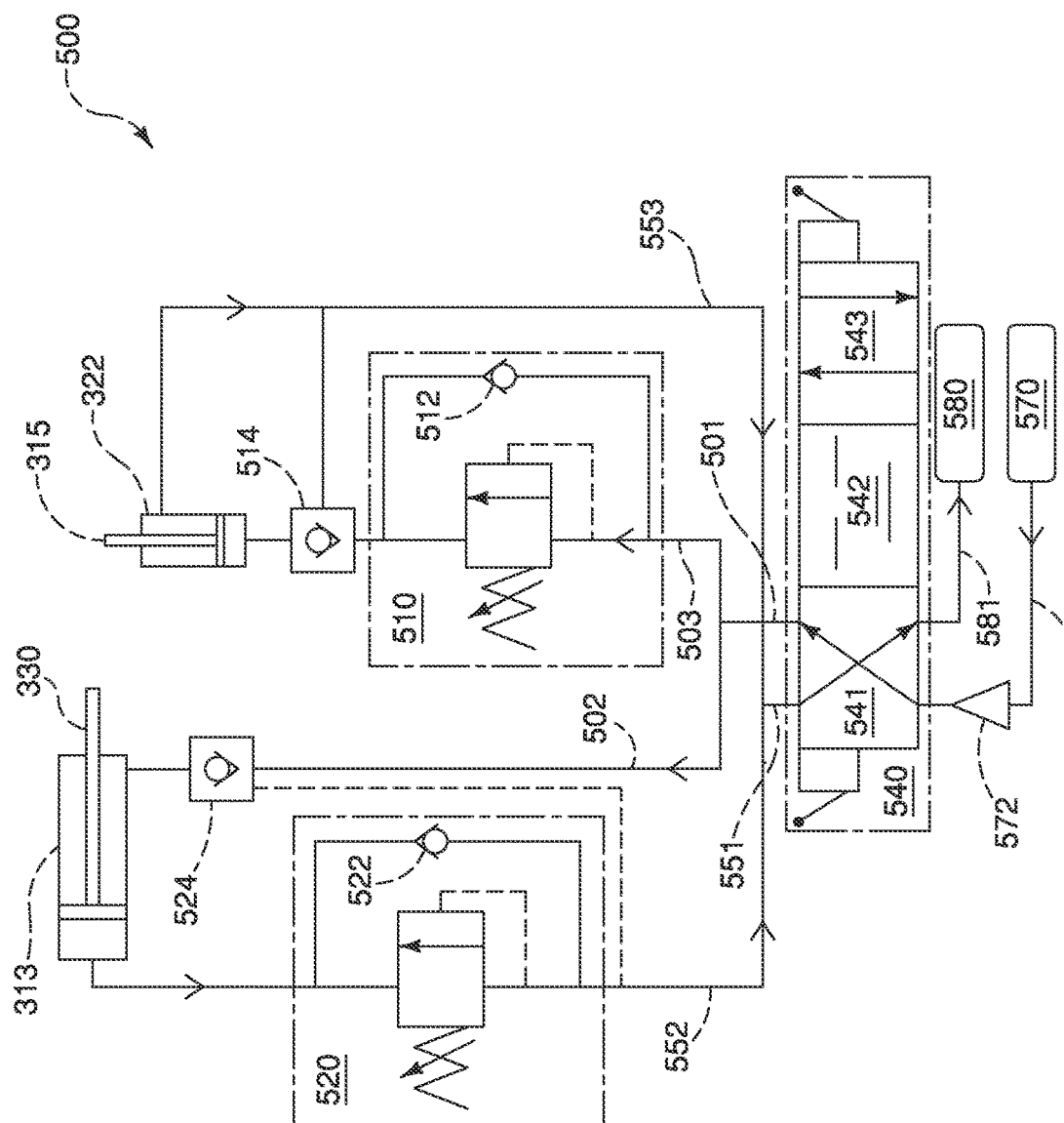

FIG. 21A is a circuit diagram of a hydraulic network system 500 used to drive hydraulic cylinders in embodiments of the invention. The three-way valve 540 controlling the system is set in position 541 to control the flow of hydraulic fluid (shown with arrows) to attain the clamped and locked position of the clamp assembly 300.

Figure 21B:
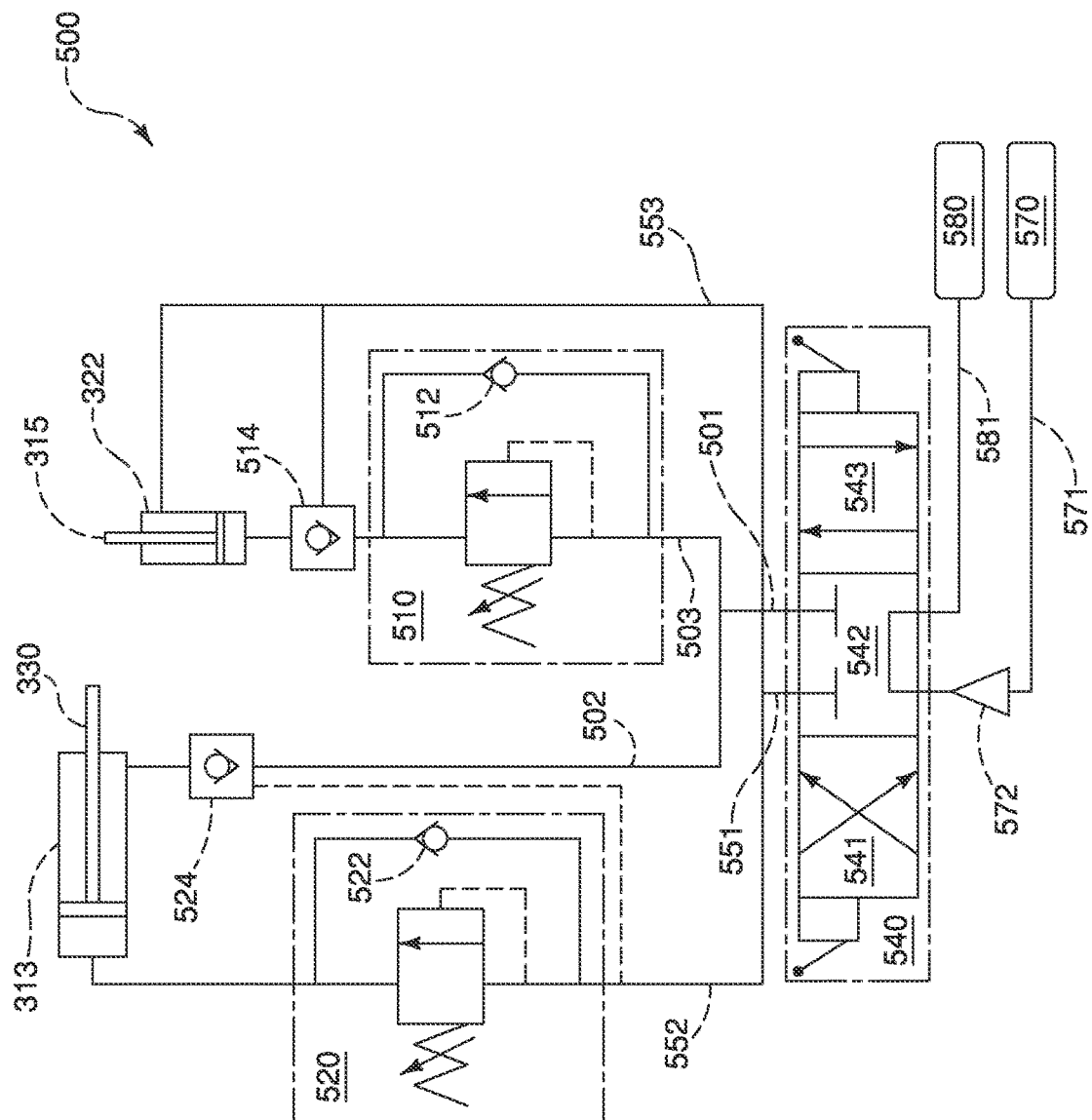

FIG. 21B is the same hydraulic network system 500 of FIG. 21A with the three-way valve 540 set in position 542 to provide a steady state clamped and locked position where hydraulic fluid remains in place and does not flow.

Figure 21C:
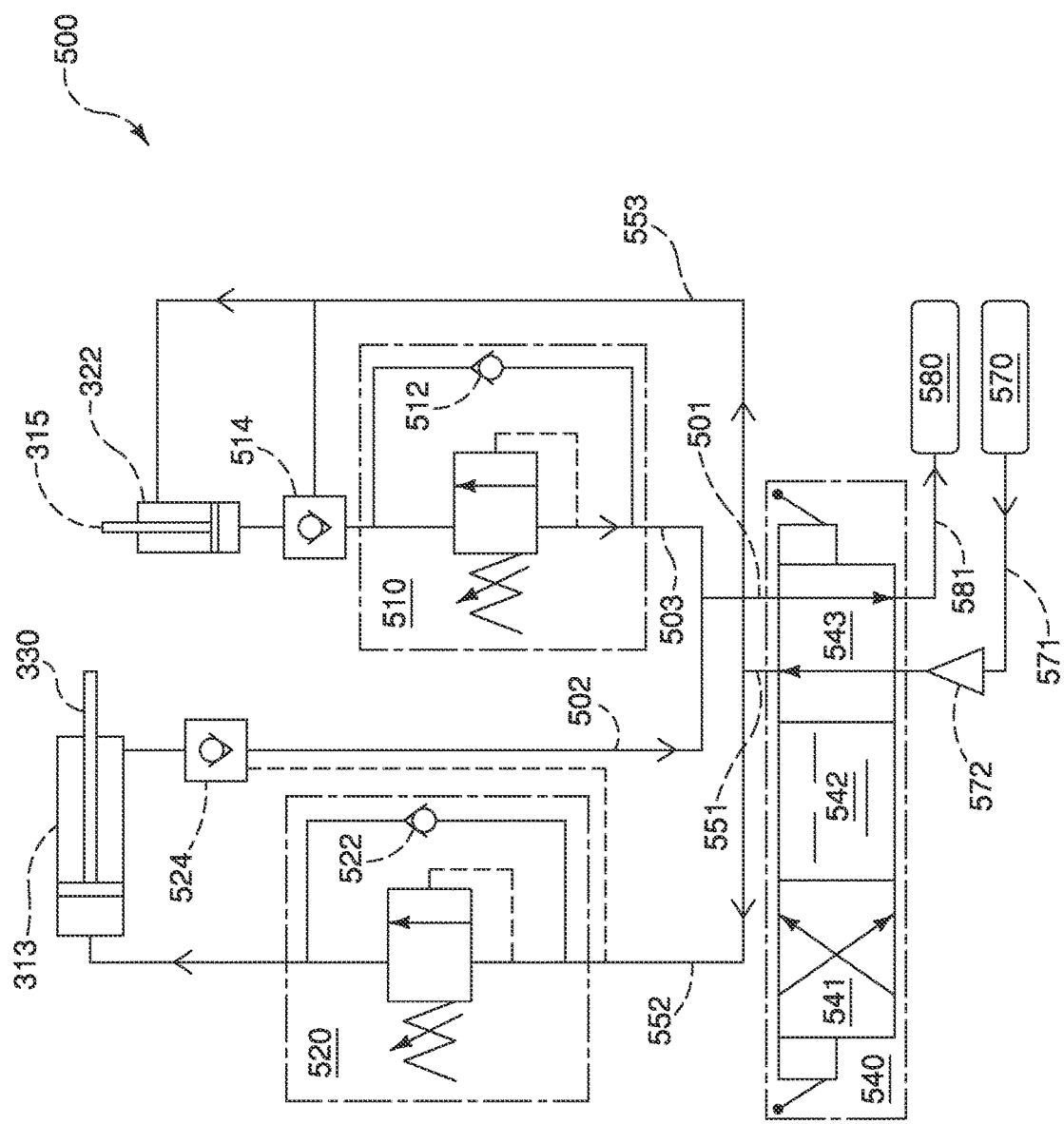

FIG. 21C is the same hydraulic network system 500 of FIGS. 21A and 21B with the three-way valve 540 set in position 543 to control the flow of hydraulic fluid (shown with arrows) to attain the unlocked and unclamped position of the clamp assembly 300.

DETAILED DESCRIPTION

Rationale

Typical BOP stack components do not experience significant wear during operations and replacement of BOP stack components is not frequently required. However, the bearing assembly component of the RCD experiences a high degree of wear, particularly on the sealing element portion of the bearing assembly (see sealing element 4 of FIG. 3 which is connected to the mandrel 2 of the RCD bearing assembly 3) as well as rotating seals during drilling operations. As a result, the bearing assembly portion of the RCD and requires a relatively frequent maintenance cycle. It is therefore desirable to remove and replace the bearing assembly component of the RCD quickly and conveniently to ensure that minimal disruption to drilling is experienced. Usually a new bearing assembly component is installed and the damaged bearing assembly component is repaired for later use.

In the past a wide range of clamping systems have been designed to make a connection between the RCD bearing assembly and the RCD main body. As the RCD will typically have operating pressure performance requirements in the range of 5,000 psi, the clamping systems used to connect the rotating control device to the BOP stack must be able to meet equivalent pressure specifications.

In addition, it is desirable that the clamping systems are easy to operate in a manner that minimizes risks to operators and personnel. That is, as the working environment of rigs involves heavy equipment that must be lifted into positions, aligned with other equipment and secured in place to operate under high pressures and generally complex working environments, systems that minimize the risks of misalignment, improper clamping and the potential for failure during operation are desired. Similarly, systems that can be readily removed from the wellhead for relocation and/or exchange of other equipment are desirable.

Figure 1:
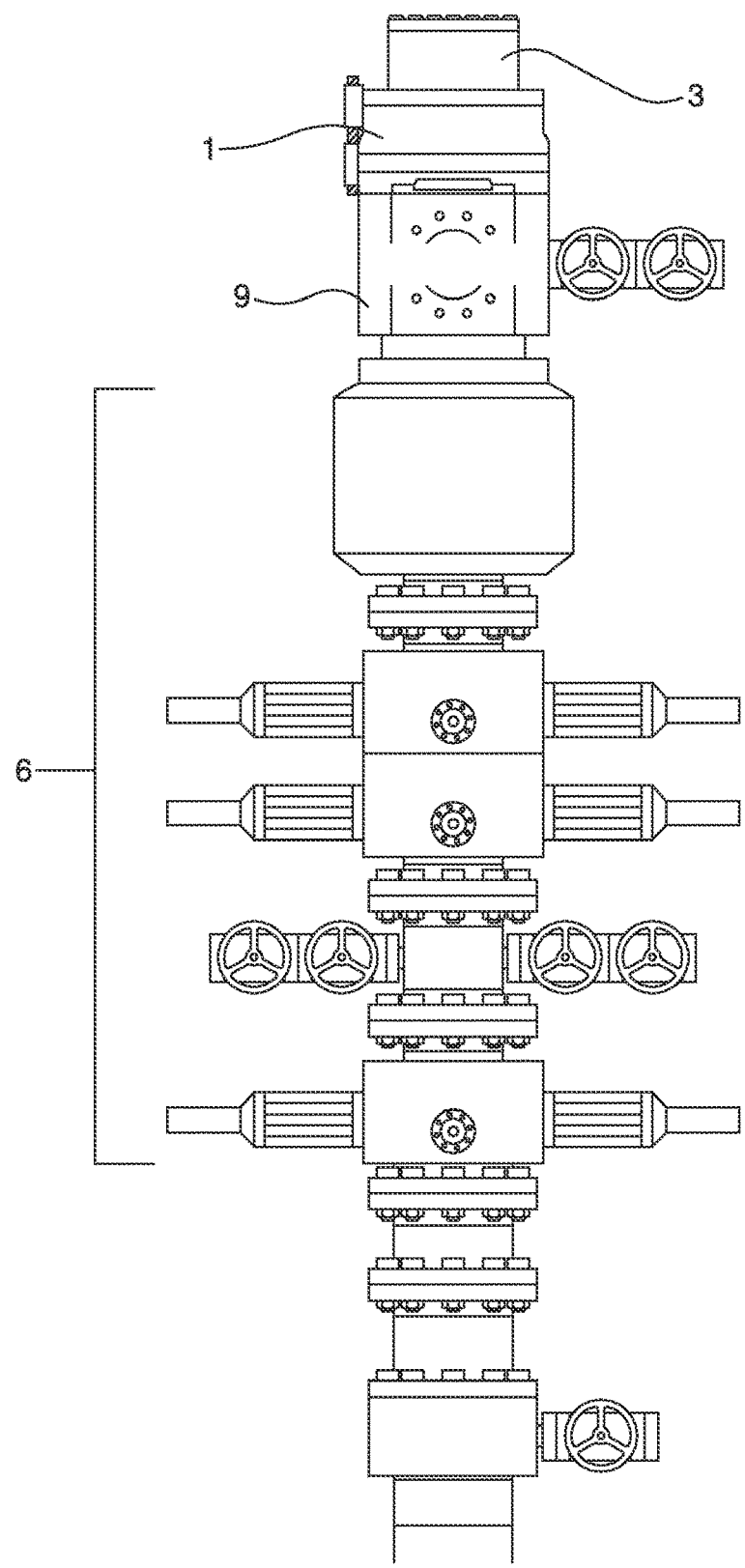
FIG. 1 is a side elevation view showing an example of an arrangement of a BOP stack 6 with a rotating control device (RCD) attached thereto and showing the RCD main body 9, the RCD bearing assembly 3 and an example of a clamp assembly 1 which is known in the prior art.

Disassembly of an RCD is particularly problematic when the RCD is located high above a very large BOP stack 6 as seen for example in FIG. 1, where it is shown that the RCD main body 9 is connected to the RCD bearing assembly 3 with a conventional clamp assembly 1 and the RCD main body 9 is coupled to the BOP stack 6 via an annular BOP.

Figure 2:
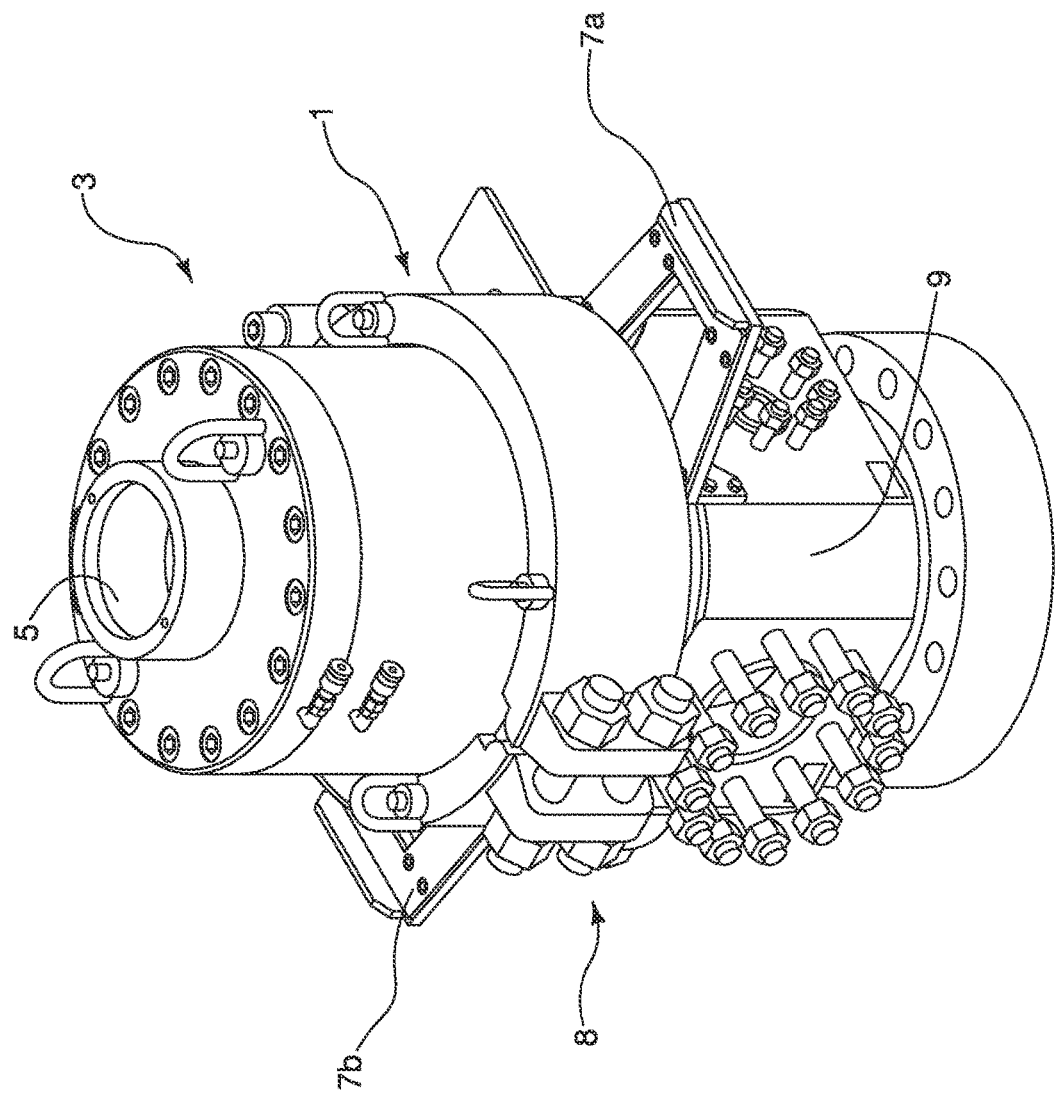
FIG. 2 is a perspective view of the clamp assembly 1 clamping the RCD bearing assembly 3 to the RCD main body 9. The clamp assembly 1 is locked using clamp bolts 8.

One conventional design of a clamp assembly 1 is shown in FIG. 2 in a perspective view where it can be seen that the clamp assembly 1 clamps a bearing assembly 3 to the RCD main body 9. The clamp assembly 1 rests upon a pair of clamp support wings 7a, 7b which are placed slightly below the radial rim of the bore of the RCD main body 9. There is a bore 5 in the top of the bearing assembly 3 to allow passage of a drill string and/or a running tool (not shown). It is seen that this clamp assembly 1 uses a pair of clamp bolts 8 to tighten the clamping assembly 1 to retain the RCD bearing assembly 3 in place against the upper rim of the RCD main body 9.

Figure 3:
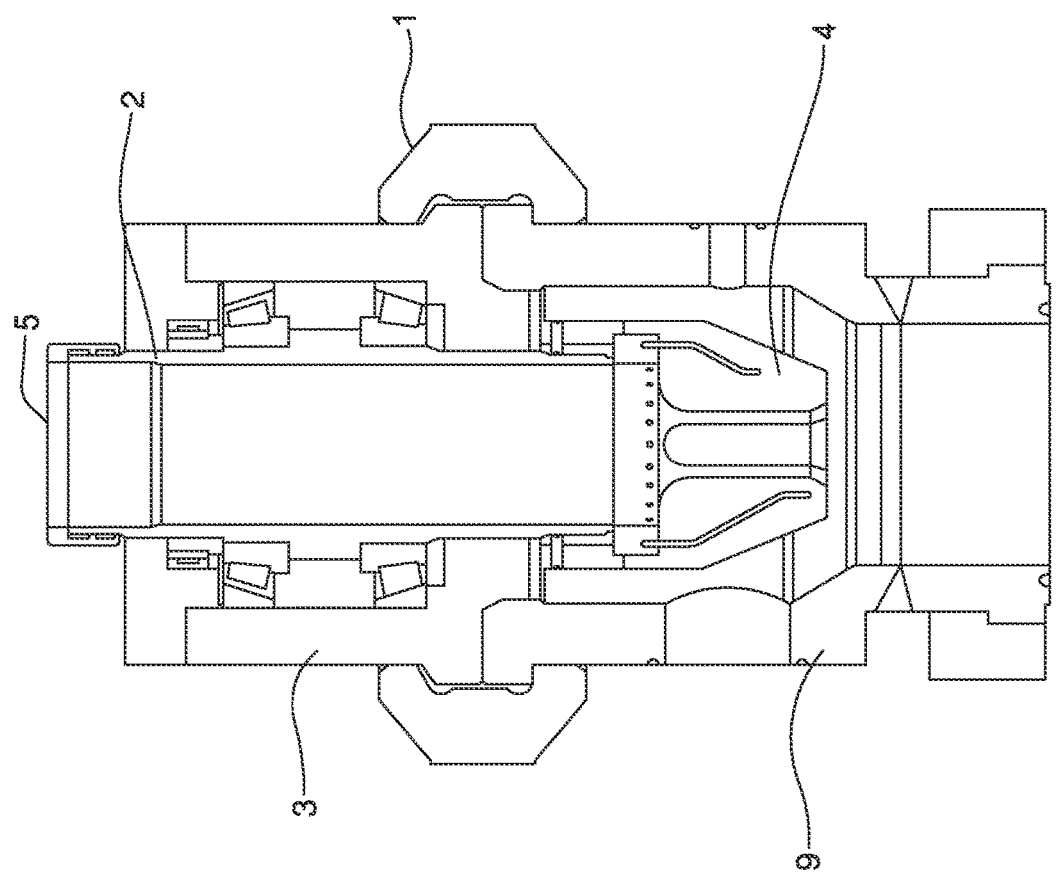
FIG. 3 is a cross sectional view of the clamp assembly 1 showing more detail of the interior of the bearing assembly 3 and the RCD main body 9.

A representative cross-sectional view of the RCD bearing assembly 3 clamped to the RCD main body 9 with a conventional clamp assembly 1 is shown in FIG. 3 to facilitate an understanding of how the mandrel 2 fits inside the RCD bearing assembly 3 and its lower sealing element 4 extends into the RCD main body 9.

Turning now to FIGS. 4A and 4B, there is shown a pair of top views of another more recently developed clamp assembly 10 which is known in the prior art. FIG. 4A shows the clamp assembly 10 in the open position and FIG. 4B is the same assembly 10 in the closed position. The RCD bearing assembly is not present in these views to facilitate viewing the operation of the clamp assembly 10. In the open position of FIG. 4A, it is seen that the paired clamp members 12a and 12b are under control of a pair of hydraulic cylinders 14a and 14b which pull the clamp members 12a and 12b together or push them apart. The clamp members 12a and 12b slide along support wings 16a and 16b which are placed below the upper rim 15 of the RCD main body. Each of the paired clamp members 12a and 12b have associated hooks 18a and 18b. When the clamp members 12a and 12b attain the closed position of FIG. 4B, the hooks 18a and 18b engage opposing clamp members 12a and 12b and positions adjacent to the respective cylinders 14a and 14b to hold the clamp members 12a and 12b in the closed position. The operation is reversed by actuation to extend the cylinders 14a and 14b to disengage the hooks 18a and 18b, thereby allowing the clamp members 12a and 12b to move away from each other. For further clarity, the open position is used to place the RCD bearing assembly on top of rim of the RCD main body 15 and the closed position is to clamp the RCD bearing assembly in place on rim of the RCD main body 15.

While effective, this design has experienced issues with being able to effectively hold pressure at the desired operating pressures. More specifically, the physical design of the hooks and levers has resulted in movement issues to occur between the mating surfaces of the hooks, levers and clamp members. This has caused pressure failures.

As such, there has been a need for an improved hydraulic clamping system that meets the requirements of enabling rapid connection and disconnection while meeting the performance requirements of higher pressures.

Introduction

Various aspects of the invention will now be described with reference to FIGS. 5 to 21. Wherever possible, similar reference numerals are used to refer to similar components in different embodiments. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Locking Cylinder Clamping Assembly with Opposed Paired Clamping and Locking Cylinders Views of a first embodiment of a clamp assembly are shown in FIGS. 5 to 7 where features of this embodiment are illustrated in perspective and cross sectional views. It is to be understood that due to the limitations imposed by these views, certain components are not visible but are to be understood from context to be present. For example, clamping cylinder 114b is not visible in any of the views of FIGS. 5 to 7 but is to be understood to be present and responsible for driving the movement of the lock arm 126a. As a result, while certain reference numerals may appear in this description, they will not be present in the drawings because the components to which they refer are hidden or located outside of magnified cross sectional views or perspective views. Nonetheless, it is believed that mention of these components is helpful in describing the functionality of this embodiment.

Turning now to FIG. 5, there is shown a perspective view of a first embodiment of a clamp assembly 100 which has a number of features providing advantages over conventional clamping systems used to hold an RCD bearing assembly (not shown) in place on the rim of the RCD main body 9. In this view of FIG. 5, the RCD bearing assembly is omitted to preserve clarity and enable viewing of the interior of the clamping members 112a and 112b. In this view, the clamping members 112a and 112b are in the closed and locked position. The clamp assembly 100 is configured to connect the RCD bearing assembly (not shown) to the top rim of the RCD main body 9, with support provided by a pair of opposed support wings 116a and 116b with only support wing 116a being visible in this perspective view (support wing 116b is to be understood to be present on the opposite side of the assembly 100). Like the device shown in FIGS. 4A and 4B, movement of the clamp members 112a and 112b towards each other and away from each other is driven by the action of a pair of clamping cylinders with only clamping cylinder barrel 114a being visible in this perspective view. As described above for the prior art device of FIGS. 4A and 4B, extending of the clamping cylinder rods (which are not visible in any of the views of this embodiment) out of the clamping cylinder barrels 114a and 114b leads to separation of the clamping members 112a and 112b to attain the open position and retracting of these same clamping cylinder rods into their respective barrels 114a and 114b leads to movement of the clamping members 112a and 112b to attain the closed position.

The clamping members 112a and 112b are each provided with a lug 124a and 124b and each lug 124a and 124b has a channel 125a and 125b. The clamping members 112a and 112b also have lock arms 126a and 126b attached thereto. It is seen in FIG. 5 that lock arm 126b is connected to clamp member 112a at its left end by a set of four bolts. In FIG. 5, the free ends of the lock arms 126a and 126b reside inside the channels 125a and 125b of the clamp lugs 124a and 124b. While not shown specifically in FIG. 5 and subsequent views in other figures of this embodiment, it is to be understood that extending of the clamp cylinder rods causes separation of the clamping members 112a and 112b and this causes the lock arms 126a and 126b to disengage from their respective channels 125a and 125b of the clamp lugs 124a and 124b. While the lugs 124a and 124b and lock arms 126a and 126b shown in FIG. 5 are shown as separate components bolted onto the clamp members 112a and 112b in other embodiments, the lugs 124a and 124b or the lock arms 126a and 126b or both the lugs 124a and 124b and the lock arms 126a and 126b are integrally formed with their corresponding clamp members 112a and 112b.

FIG. 6 is a partially exploded view of the right side of the clamp assembly 100 and FIG. 7 is a cross sectional view of components associated with the clamp locking mechanism. While FIGS. 6 and 7 are focused on the right side of the clamp assembly, it is to be understood that identical components with identical functions are provided with respect to the clamp lug 124a, lock arm 126a and other related components on the left side of the clamp assembly 100. FIGS. 6 and 7 together indicate that there is a lug bore 127b formed in the lug 124b and a lock arm bore 132b formed in lock arm 126b. The lug bore 127b and the lock arm bore 132b are aligned when the clamping assembly 100 is in the completely closed position. These aligned bores 127b and 132b allow entry of lock pin 134b which provides a mechanical locking mechanism. Lock pin 134b is oriented with its longitudinal axis substantially parallel with the axis of rotation of the rotating control device and driven upward and retracted downward (as indicated by the double arrow) via extending and retracting of the locking cylinder rod 130b which is connected at its upper end to the lock pin 134b. The majority of the length of locking cylinder rod 130b is contained in locking cylinder barrel 122b in this view. While the term "lock pin" is used as a descriptive term herein, it is to be understood that this elongated component may be provided in any number of shapes to match complementary bore shapes for the purpose of locking the lug 124b to the lock arm 126b.

In FIG. 7, it can be seen that the lug bore 127b has an upper portion and a lower portion. The upper portion of the lug bore 127b is provided with a wear insert 136b on the left side of the upper lug bore 127b. The right side of the lock arm bore 132b is provided with a wear insert 137b. The left side of the lower portion of the lug bore 127b is also provided with a wear insert 138b. These wear inserts 136b, 137b and 138b provide surfaces for contact with the lock pin 134b and are replaceable if damaged by excessive wear or galling. In some embodiments, the wear inserts 136b, 137b are loosely coupled to the outer sidewall of the bores within which they reside with some movement allowance. Such "floating" inserts provide some flexibility in case some of the wear surfaces acquire some wear damage but not sufficient damage to warrant replacement.

FIG. 7 shows the lock pin 134b in an unlocked position with its upper end just below the lock arm bore 132b (in this position, the clamping cylinders can separate the two clamp members 112a and 112b. The locked position is attained when the lock pin 134b passes through the lock arm bore 132b and enters the upper lug bore 127b. A number of useful features are provided in the lock pin locking mechanism and will be described in more detail hereinbelow.

A cap 129b is provided above the upper lug bore 127b to protect the components contained therein and to allow access to the lug bore 127b for maintenance of the components contained therein. The cap 129b has an interior hollow volume to allow entry of at least a portion of the lock pin 134b in this embodiment. In other embodiments, the lock pin 134b does not extend beyond the lug bore.

A lock pin housing 128b is provided to contain the lock pin 134b and to bridge between the locking cylinder barrel 122b and the lug 124b. It is to be understood that an identical arrangement is provided (but not visible in FIGS. 5-7) on the left side of the clamping assembly 100 in association with locking cylinder barrel 122a, clamp lug 124a, and lock arm 126a.

FIGS. 8A-8E are expanded cross sectional views which are generally similar to the view of the cross-sectional view of FIG. 7. FIGS. 8A-8E show successive upward movement of the lock pin 134b with the objective of illustrating how surfaces of lock pin 134b encounter the surfaces of the wear inserts 136b, 137b and 138b and provide mechanical alignment of the lock arm bore 132b with the lug bore 127b. It is to be understood that extending of the locking cylinder rod 130b causes the upward movement of the lock pin 134b. The cap 129b is omitted from FIGS. 8A-8E.

In FIG. 8A, the top of the lock pin 134b is located below the lock arm bore 132b. The left side of the lock pin 134b slides against the outer surface of wear insert 138b and there is a gap between the right side of the lock pin 134b and the sidewall of the lower portion of the lug bore 127b. In this view, the lock arm bore 132b is generally aligned but not completely aligned with the upper and lower portions of the lug bore 127b. It is seen that wear insert 137b on the right side of the lock arm bore 132b is partly aligned with the upper and lower portions of the lug bore 127b.

In FIG. 8B, relative to FIG. 8A, the top of the lock pin 134b has moved up inside the lock arm bore 132b. In this view, it is indicated that wear insert 137b has a tapered surface 2137b and that lock pin 134b also has a tapered surface 3134b on its right side which is angled by about 5 degrees. There remains a gap between these two surfaces within the lock arm bore 132b and the alignment of the lock arm bore 132b with the lug bore 127b remains offset as it is in FIG. 8A. It is also seen that the right side of the lock pin 134b has a second tapered surface 4134b with an angle of about 15 degrees located below tapered surface 3134b. In this view, the lug bore 127b and the lock arm bore 132b are in the same alignment as seen in FIG. 8A.

Figure 8C:
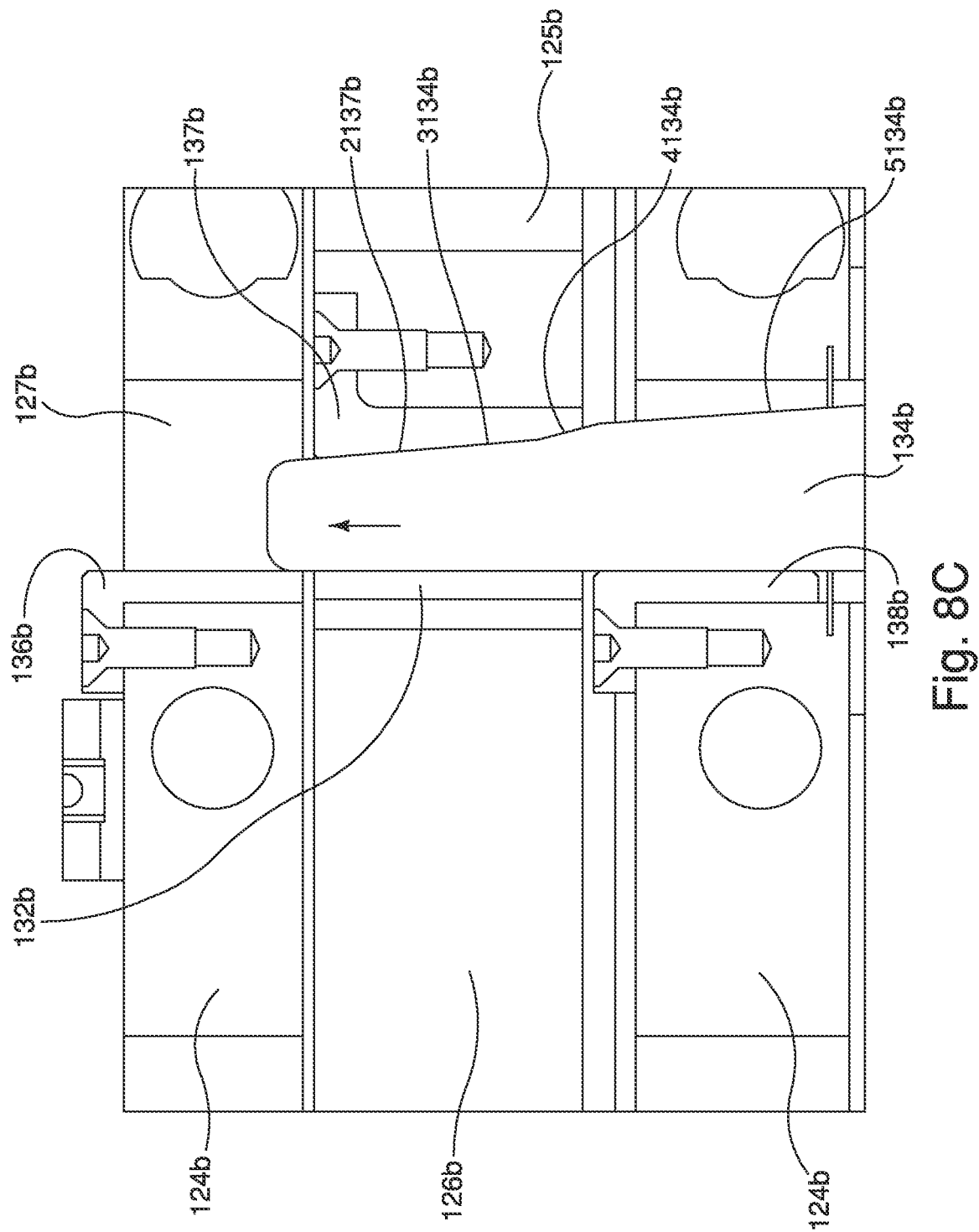
FIG. 8C is a cross-sectional view through the lug 124b and lock arm 126b showing a third position of the lock pin 134b as it moves upward into the upper lug bore 127b as indicated by the arrow.

In FIG. 8C, the top of the lock pin 134b has moved up past the lock arm bore 132b and into the upper portion of the lug bore 127b. The tapered surface 3134b of the lock pin 134b is slidingly engaged with the tapered surface 2137b of the wear insert 137b and the second tapered surface 4134b of the lock pin 134b is just beginning to encounter the tapered surface 2137b of the wear insert 137b. In this view, the lug bore 127b and the lock arm bore 132b are in the same alignment as FIGS. 8A and 8B.

In FIG. 8D, the top of the lock pin 134b is located approximately halfway up the upper lug bore 127b. At this stage, the second tapered surface 4134b is now just beginning to push against wear insert 137b. This force urges the lock arm 126b towards the right side and brings the lock arm bore 132b into closer alignment with the lug bore 127b (in a comparison of FIG. 8C with 8D, it is seen that the volume of the lock arm bore 132b to the left of the lock pin 134b is decreased in FIG. 8D relative to its volume in FIG. 8C.

Figure 8E:
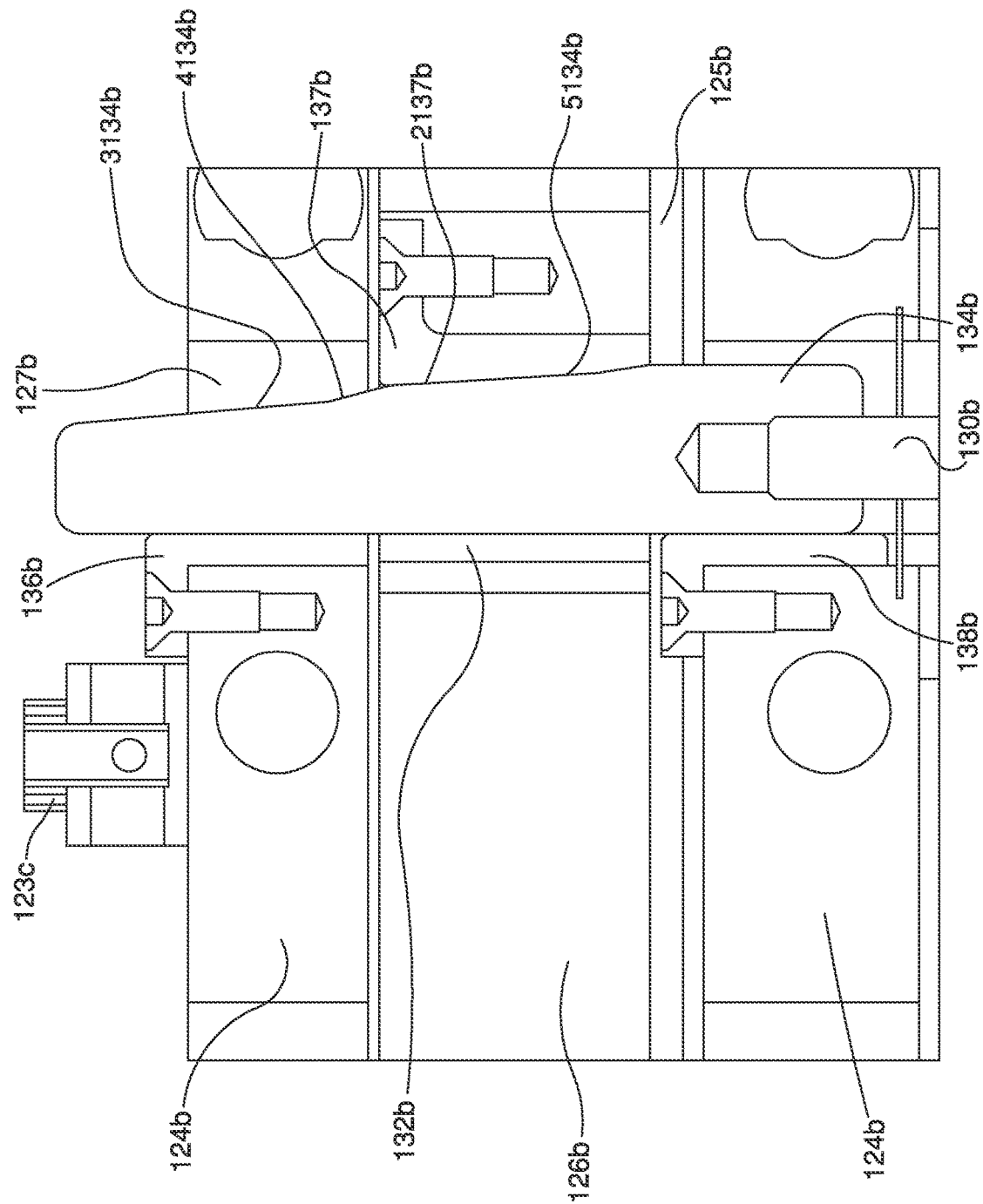
FIG. 8E is a cross-sectional view through the lug 124b and lock arm 126b showing the final upper position of the lock pin 134b above the lug 124b.

In FIG. 8E, the top of the lock pin 134b has attained its uppermost position above the top surface of the lug 124b. The tapered surface 5134b of the lock pin 134b is fully engaged against the tapered surface 2137b of the wear surface 137b because the wear insert 137b and the lock arm 126b have been pushed further to the right, thereby aligning the lug bore 127b with the lock arm bore 132b. It is seen that wear inserts 136b and 138b are aligned with the remaining volume of the lock arm bore 132b.

It is to be understood that the upward motion of the lock pin 134b which pushes the lock arm 126b to the right is duplicated on the opposite side of the clamp assembly 100. This has the effect of tightening the clamp members 112a and 112b against each other to simultaneously effect a final clamping and locking motion. In one embodiment, both clamping cylinders are controlled simultaneously to provide substantially identical extending and retracting movements to lock and unlock both sides of the clamp assembly 100 simultaneously.

The surfaces of the wear inserts 136a,b, 137a,b and 138a,b and the lock pins 134a,b will preferably be oversized and have tolerances that allow for wear of these surfaces during repeated operations. In some embodiments, the wear inserts 136a,b, 137a,b and 138a,b and the lock pins 134a,b are replaceable.

In some embodiments, the clamping and locking cylinders are provided with connectors that allow convenient removal of the cylinders from the clamp assembly to facilitate maintenance and/or replacement.

Locking Cylinder Clamp Assembly with a Clamping Cylinder, a Locking Cylinder and an Opposed Hinge Another embodiment of a clamp assembly 300 will now be described with reference to FIGS. 9A to 17. The components of clamping assembly 300 are generally similar to those of clamp assembly 100 unless otherwise described herein.

Figure 9A:
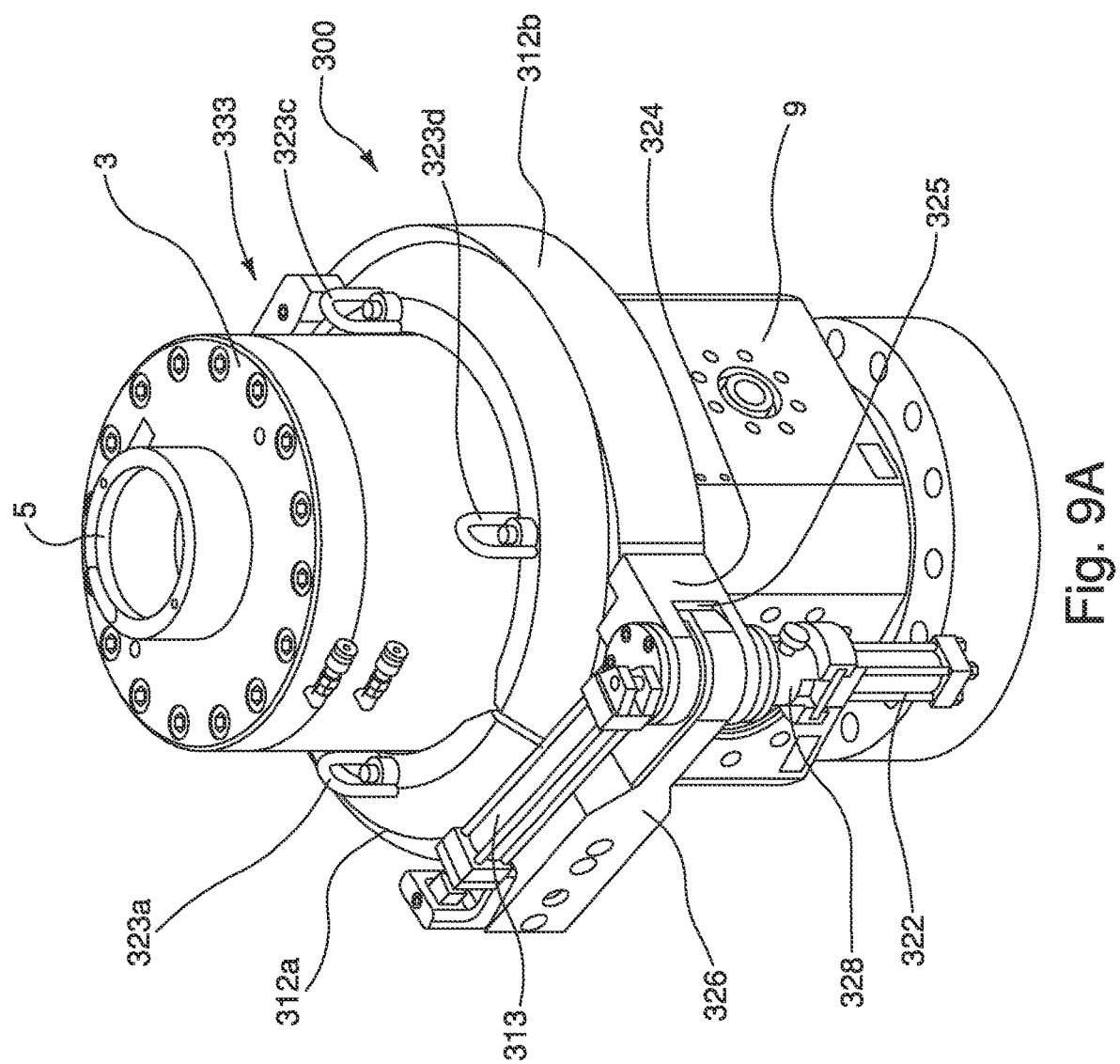
FIG. 9A is a perspective view of a second embodiment of a clamp assembly 300 shown connecting the RCD bearing assembly 3 to the RCD main body 3 with the clamping and locking components shown at the front left.
Figure 9B:
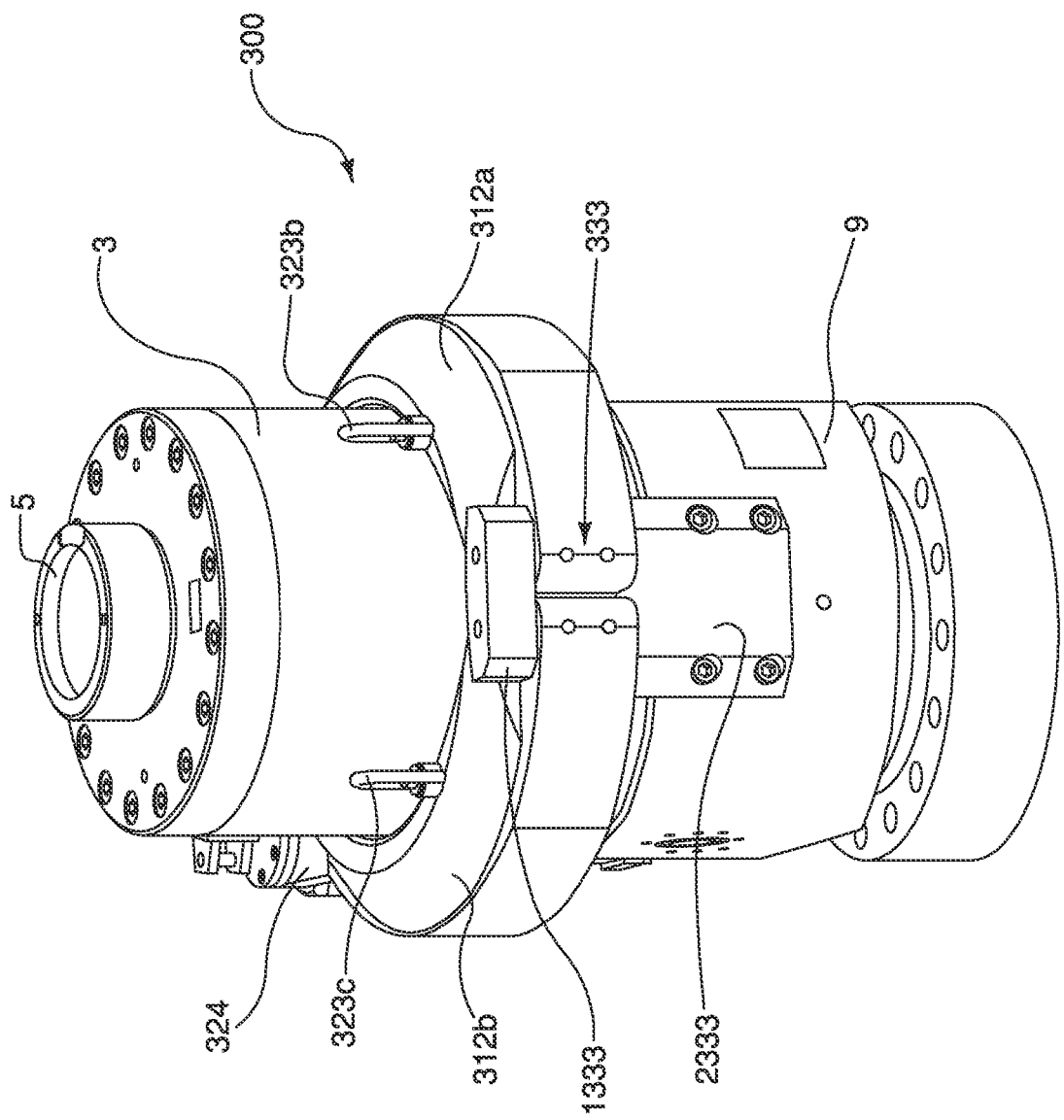
FIG. 9B is another perspective view of the same clamp assembly 300 of FIG. 9A with the hinge 333 shown at the front.

FIGS. 9A and 9B are opposing perspective views of clamp assembly 300 in the closed (clamped) position and shown connecting an RCD bearing assembly 3 to an RCD main body 9. It is seen that this embodiment 300 of the clamp assembly includes clamp members 312a and 312b with hoist rings 323a-d (to facilitate placement and/or removal of the clamping assembly 300), a single clamping cylinder barrel 313 (with its corresponding cylinder rod 330 retracted therewithin) mounted on a lock arm 326 and a single locking cylinder barrel 322 connected to a lug 324 via a lock pin housing 328. The lock arm 326 is placed in the channel 325 of the lug 324. Instead of another similar arrangement of clamping and locking cylinders on the opposite side of the device (as described for the previous main embodiment), there is a hinge 333 including a top hinge bracket 1333 and a lower hinge connector plate 2333.

As described above for the previous embodiment, the lug 324 and the lock arm 326 are shown as separate components bolted onto the clamp members 312a and 312b in other embodiments, the lug 324 or the lock arm 326 or both, are integrally formed with their corresponding clamp members 312a and 312b.

It should be appreciated that this arrangement will be less costly to manufacture and maintain because fewer hydraulic cylinders are incorporated into the clamp assembly 300.

The hinge 333 allows direct connection of the clamp assembly 300 to the RCD main body 9 via the connector plate 2333 and therefore allows the commonly employed clamp support wings, such as the clamp support wings 7a and 7b of the clamp assembly embodiment 100 (see FIG. 2) to be omitted from the clamp assembly 300. This is a favorable arrangement because it reduces the lateral profile of the entire assembled structure of the clamp assembly 300 with respect to embodiment 100 as well as a number of clamp assemblies known in the prior art.

Figure 10:
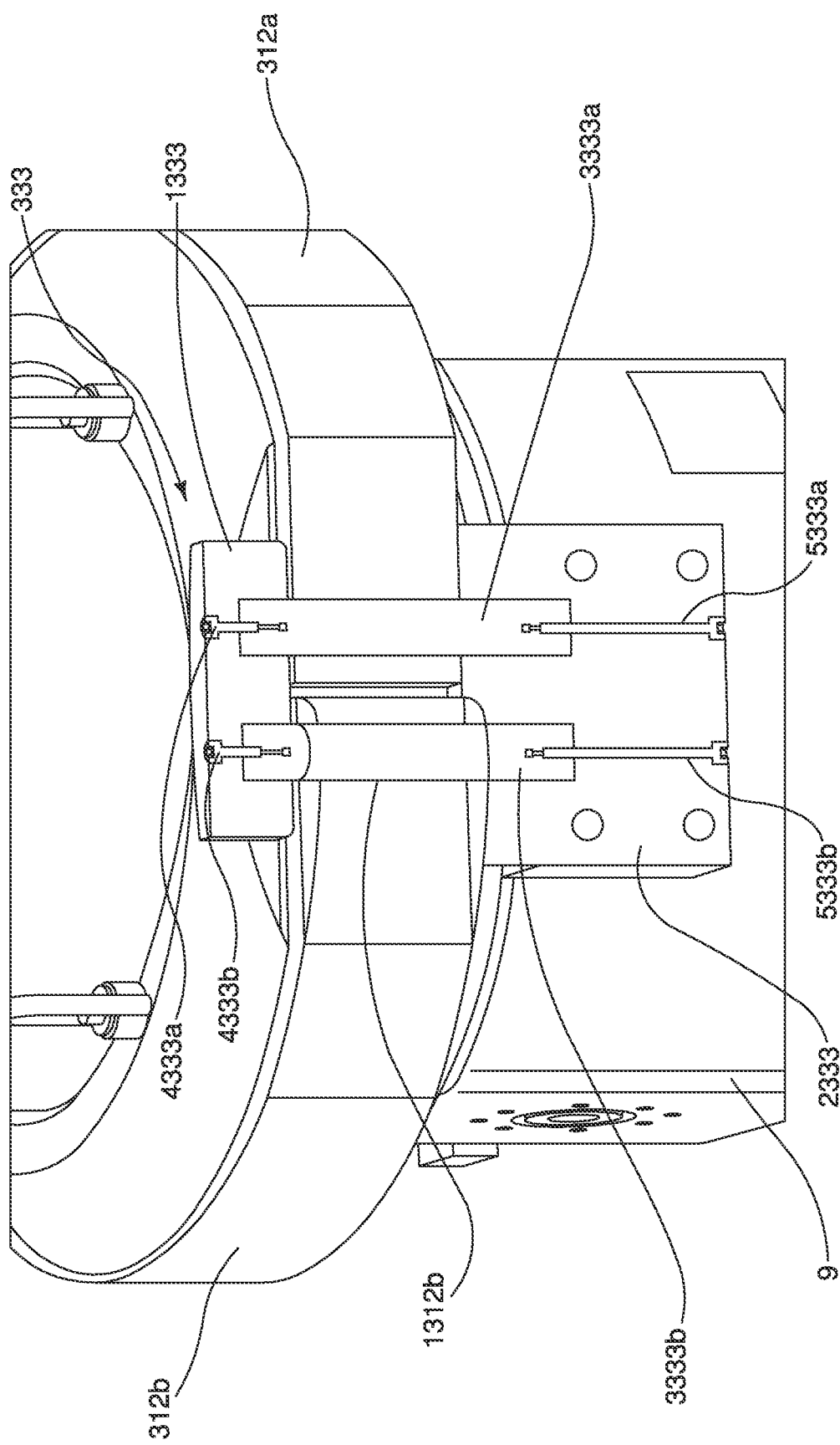
FIG. 10 is a magnified view of the hinge 333 shown with clamp member 312b shown in phantom view (left side) with components of the hinge 333 and the clamp member 312a shown in cross section.

FIG. 10 is a magnified view of the hinge with clamp member 312b shown in a phantom view to indicate passage of a left hinge axle 3333b therethrough. The opposing clamp member 312a is shown in a partial cross-sectional view and the top bracket 1333, the right hinge axle 3333a are also shown in cross-sectional view. The top bracket 1333 is fixed to the tops of both axles 3333a,b with screws 4333a,b and the connector plate 2333 attached to the RCD main body 9 is fixed to the bottoms of both axles 3333a,b with screws 5333a,b. The clamp members 312a and 312b pivot around the axles 3333a,b during opening and closing of the clamp members 312a and 312b when the hinge 333 is operating.

Figure 11:
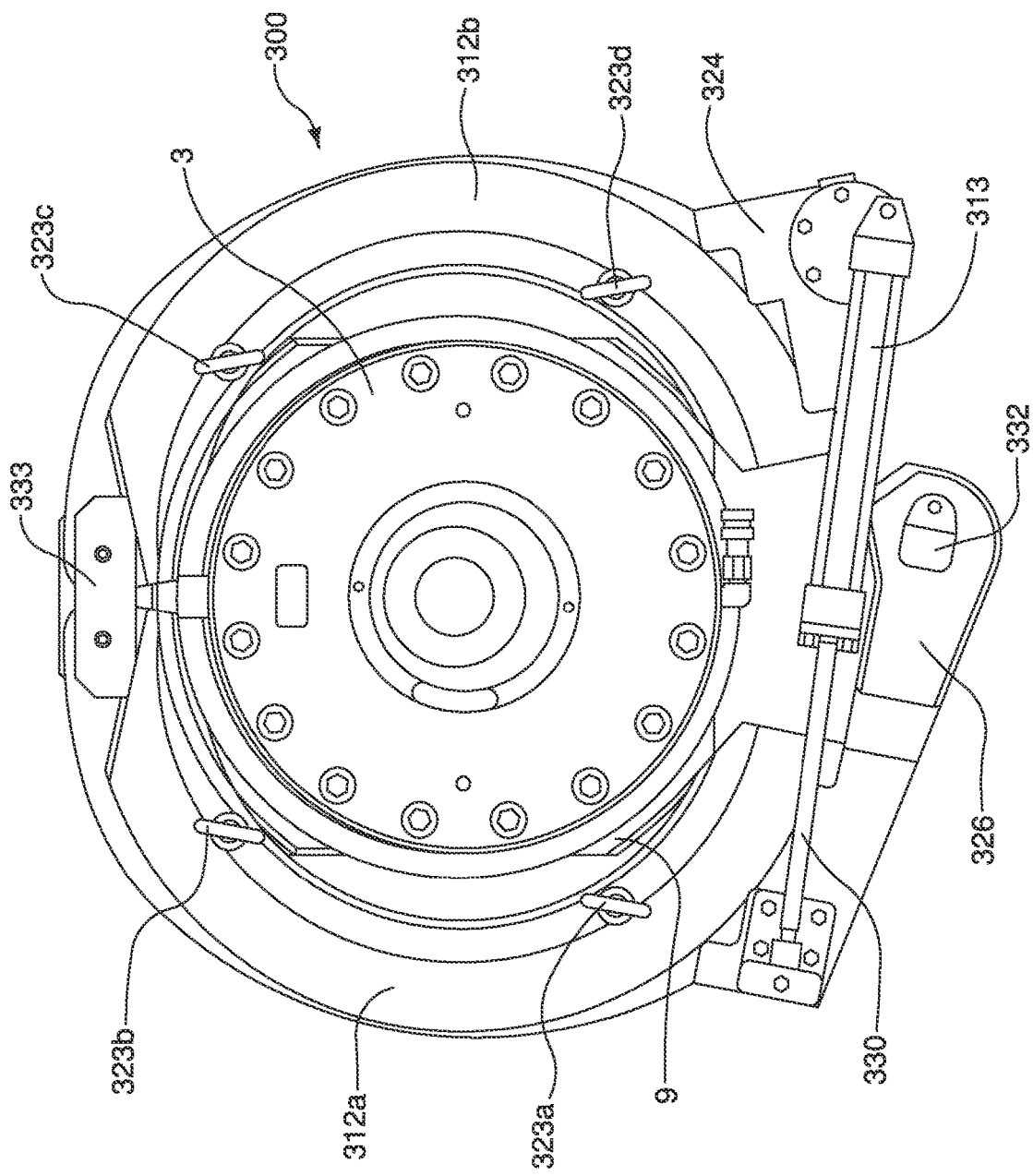
FIG. 11 is a top view of the clamp assembly 300 with clamp members 312a and 312b separated (open position) which would allow removal of the RCD bearing assembly 3 from the RCD main body 9, which is not visible in this view. The clamping cylinder rod 330 is extended from the clamping cylinder barrel 313.

FIG. 11 is a top view of clamp assembly 300 in the open position. It is seen that the clamping cylinder rod 330 is extended out to the left from the clamping cylinder barrel 313. This extending of the clamping cylinder rod 330 pushes on the left end of the lock arm 326 because it is connected thereto. Because the left end of lock arm 326 is connected to clamp member 312a and the right end of the clamping cylinder barrel is connected to the lug 324 and the lug 324 is connected to clamp member 312b, it should be understood that extending of the clamping cylinder rod 330 separates the two clamp members 312a and 312b. The hinge 333 allows pivotal movement of these clamping members 312a and 312b while they are held in close proximity at the hinge 333. The clamping members 312a and 312b are opened sufficiently to allow the RCD bearing assembly 3 to be removed from the top of the RCD main body 9, whose outer corners are visible in FIG. 11 between the circumference of the RCD bearing assembly 3 and the clamp members 312a and 312b. The lock arm 326 is removed from the channel 325 (see FIG. 9A) of the lug 324. In this position, the lock arm bore 332 is visible.

FIG. 12 is a top view of the clamp assembly 300 in the closed position. The clamping cylinder rod 330 is retracted inside the clamping cylinder barrel 313. The right end of the lock arm 326 is now inside the channel 325 of the lug 324 and the clamp members 312a and 312b are pulled together to clamp the RCD bearing assembly 3 in place on the rim of the RCD main body 9 (whose corners are no longer visible in this view).

FIG. 13 is a side elevation view of the clamp assembly 300 to facilitate an understanding of the arrangement of components described for this embodiment. In addition, the position of a secondary lock member 350 on the right side of the lock pin housing 328 is indicated. The function of the secondary lock member 350 will be described in more detail hereinbelow with reference to FIGS. 16 and 17.

FIGS. 14A and 14B provide partial cross-sectional views of the locking mechanism driven by the locking cylinder rod 315. In FIG. 14A, it is seen that the majority of the wedge-shaped lock pin 334 resides inside the bore of the lock pin housing 328 with a top portion residing in the lower part of the lug bore 327 which includes a wear insert 342. The lock arm bore 332 includes a tapered wear insert 337 on the right side and otherwise is unoccupied. There is also a wear insert 341 in the upper part of the lug bore 327 and a wear insert 343 in the bore of the lock pin housing 328. The wear insert 343 has a square bore. This bore may have other shapes to align with similar alternative shapes of the bores of the other wear inserts but should be non-circular to provide the capability to take the bore of the wear insert 343 out of alignment with the bores of the other wear inserts and the lock arm bore 332. The secondary lock member 350 is also seen connected to the lock pin housing 328. The wear inserts 341 and 343 of the lug bore 327 are square inserts which fit inside the square lug bore 327. This is seen more clearly in the top perspective view of FIG. 15. The cross sectional profile of the base of the lock pin 334 is square but the upper portions are wedge shaped as shown in FIGS. 14A and 14B. It is to be understood that when the clamping process is complete after full retraction of the clamping cylinder rod 330, the lug bore 327 and the lock arm bore 332 will not be completely aligned. The final alignment of these bores 327 and 332 is obtained as the lock pin 334 moves upward into the lock arm bore 332 (as driven by the locking cylinder rod 315) and the sloped surface visible on the right of the lock pin 334 begins to encounter the sloped surface of the wear insert 337 in the lock arm bore 332. This contact between the sloped surfaces of the lock pin 334 and the wear insert 337 has the effect of gradually pushing the lock arm 326 to the right to generate alignment of the bores 327 and 332. The effect of this movement also causes the lug 324 to be pushed to the left. When the final locking position of the lock pin 334 is attained, its upper portion will reside within the upper lug bore 327. In some embodiments, a sensor (not shown) is provided to sense the presence of the lock pin 334 at its uppermost position. This sensor is coupled to an indicator visible to a person operating the clamping assembly 300 so that the operator knows exactly when the lock pin 334 has reached the final locking position. In some embodiments, the sensor is a pressure sensor located on the ceiling of a cap (not shown) covering the top of the upper lug bore 327. In some embodiments, the sensor is calibrated to provide an indication of any of the position of the lock pin 334 during its movement through both portions of the lug bore 327 and the lock arm bore 332.

In this embodiment, the lock pin 334 is replaceable and is connected to the locking cylinder rod 315 with a T-slot nut which resides within a cavity in the lock pin 334. Other reversible means for connecting the lock pin 334 to the locking cylinder rod 315 may also be used. The ability to replace the lock pin 334 is helpful because the lock pin 334 is expected to experience a significant degree of wear as it contacts the surfaces of the wear inserts 341, 337, 342 and 343.

The secondary lock member 350 is connected to the wear insert 343 within the lock pin housing 328. The function of the secondary lock member 350 will be described in more detail below.

FIG. 15 is a perspective view of the clamping assembly 300 with a focus on the upper surface of the lug 324 and showing the generally square shape of the lug bore 327 and the lug bore wear insert 341, as well as the lock pin housing 328 connected to the lower surface of the lug 324. The secondary lock member 350 is shown connected to the right side of the lock pin housing 328.

FIG. 16 is a perspective view of the clamping assembly 300 with a focus on the lock pin housing 328. The secondary lock member 350 is connected to the wear insert 343 contained within the bore of the lock pin housing 328. Lock pin housing 328 has a barbell-shaped slot 1328 and the secondary lock member 350 housing extends through the slot 1328. The radiused ends of the slot 1328 allow the secondary lock member 350 to drop and be held in place therewithin. In FIG. 16, the secondary lock member 350 is shown in the unlocked position in the radiused left end of the slot 1328.

FIG. 17 is a cross sectional perspective view of the lock pin housing 328 with the cut made across the lock pin housing 328 to show features of the wear insert 343, the lock pin 334 and the secondary lock member 350 which occupies the radiused left end of the slot 1328. It is seen that the wear insert 343 has a circular outer sidewall which allows it to rotate within the bore of the lock pin housing 328 while holding the square lock pin 334. Therefore, the secondary lock member 350 can be grasped by its outer knob, lifted out of the lower edge of the radiused end, and moved counterclockwise through the slot 1328 until it reaches the opposite radiused right end of the slot 1328 where it drops and holds the wear insert in place at location disposed at a 45 degree angle from its originating position. The purpose of this operation is to rotate the square profile of the bore of the wear insert 343 when the bottom of the lock pin 334 is located above the wear insert 343. When the wear insert 343 is rotated by 45 degrees in this situation, the square bore of the wear insert 343 is no longer aligned with the profile of the lock pin 334 and therefore, the lock pin 334 cannot drop down into the lock pin housing 328. This arrangement provides a secondary locking mechanism to prevent the lock pin 334 from inadvertently dropping into the lock pin housing 328. It is to be understood that this mechanism may be provided with any shaped bore other than a circular bore.

In this embodiment, the locking pin 334 is replaceable and is connected to the locking cylinder rod 315 with a T-slot nut 344 (see FIG. 14A).

Locking Cylinder Clamp Assembly with Opposed Clamping and Locking Cylinders

Another embodiment of a clamp assembly 400 will now be described with reference to FIGS. 18 to 20. Clamp assembly 400 has a number of similarities shared with the previously described clamp assembly 300. One major difference however, is that the clamping cylinder 413 and the locking cylinder barrel 322 and lock pin housing 328 (as well as components associated with the latter) are located on opposite sides of the clamp assembly 400 whereas they are located on the same side in clamp assembly 300. There are a number of advantages associated with this clamp assembly embodiment 400 which will be described in detail hereinbelow. FIGS. 18A and 18B are opposing perspective views of clamp assembly 400 in the closed (clamped) position and FIGS. 19A and 19B are opposing perspective views of the clamp assembly 400 in the open (unclamped) position. In FIGS. 18-20, the clamp assembly 400 is shown connecting an RCD bearing assembly 3 to an RCD main body 9. It is seen in FIG. 18A that this embodiment 400 of the clamp assembly includes clamp members 412a and 412b with a single clamping cylinder barrel 413 (with its corresponding cylinder rod 430 extended therefrom) mounted between a pair of opposed extensions 435a and 435b which are integrally formed with the clamp members 412a and 412b. The clamping arrangement of this clamp assembly embodiment 400 functions differently than the clamping arrangement of clamp assembly 300 in that extending of the clamping cylinder rod 430—shown in the fully extended position in FIGS. 18A and 18B—pushes the extensions 435a,b away from each other to cause the clamp members 412a,b to attain the clamped and closed position. The differences in positioning of the clamp members 412a,b and the clamping cylinder rod 430 are best observed in the adjacent top views shown in FIG. 20A (closed and clamped, rod 430 extended) and FIG. 20B (open and unclamped, rod 430 retracted).

FIG. 18B illustrates that the single locking cylinder barrel 322 is connected to a lug 424 via a lock pin housing 328 on the side of the clamp assembly 400 opposite the clamping cylinder barrel 413 and rod 430. The lock pin housing 328, the lock pin 334 (seen only in FIG. 19B) and the locking cylinder barrel 322 are the same as described for clamp assembly embodiment 300 and likewise all components shown in FIGS. 14A-17 are also included in clamp assembly embodiment 400 and are the same and function in the same manner as in clamp assembly embodiment 300.

The lock arm 439 is integrally formed with clamp member 412a and its free end is placed within the channel 425 of the lug 424 to align its lock arm bore 432 (FIG. 19B) with the lug bore 427. The lug bore 427 is provided with wear inserts (not shown) which are similar to the wear inserts 341, 342 and 343 of clamp assembly embodiment 300.

Clamp assembly 400 includes a hinge which the same and functions in the same manner as hinge 333 of the clamp assembly 300 (FIG. 10). There is a top hinge bracket 1333 and a lower hinge connector plate 2333. The top hinge bracket 1333 is located adjacent to the clamping cylinder barrel 413. The hinge of this clamp assembly embodiment 400 provides all of the advantages described hereinabove with respect to clamp assembly embodiment 300.

Hydraulic Cylinder Control System for Clamp Assembly

One embodiment of a hydraulic cylinder control system 500 for driving the hydraulic cylinders used to clamp and lock embodiments of the clamping assembly of the invention will now be described with respect to FIGS. 19A-19C. For the sake of simplicity, the description refers to only a single clamping cylinder and a single locking cylinder which would be used in conjunction with clamp assembly 300 (the entire clamp assembly 300 is not shown in FIGS. 21A-21C but the clamping 313, 330 and locking 315, 322 cylinders are shown). However, the system 500 may be readily adapted to operate the clamp assembly 100 or the clamp assembly 400 described hereinabove. To facilitate understanding of the operation of the control system 500, the operation is described in the following example where the clamping and locking cylinders of clamp assembly 300 are driven by the control system 500.

FIGS. 21A-21C show an embodiment of a hydraulic control system 500 which has a first port 501, a second port 551 and a hydraulic network connected to both of these ports 501 and 551. The hydraulic network 500 has two separate connections to the clamping cylinder barrel 313 and two separate connections to the locking cylinder barrel 322 (both of which are located near the top of FIGS. 21A-21C).

The clamping cylinder rod 330 driven by hydraulic fluid drives opening and closing of the clamp assembly 300, depending on the entry point of the hydraulic fluid into the clamping cylinder barrel 313. Moving the clamping cylinder rod 330 in the closing direction (to the left) retracts the clamping cylinder rod 330 into the clamping cylinder barrel 313 to close the clamp assembly 300. Moving the clamping cylinder rod 330 in the opening direction (to the right) extends the clamping cylinder rod 330 out of the barrel 313 and opens the clamp assembly 300.

The hydraulic network 500 is also connected at two points to the locking cylinder barrel 322 as noted above. The locking cylinder rod 315 driven by hydraulic fluid in the system 500 drives locking and unlocking of the clamp assembly 300 wherein moving the locking cylinder rod 315 in the locking direction (upward) locks the clamp assembly 300 and moving the locking cylinder rod 315 in the unlocking direction (downward) unlocks the clamp assembly 300.

In FIG. 21A, hydraulic fluid is pumped into the control system 500 via the first port 501. This causes fluid to be first directed to the clamping cylinder barrel 313 via conduit 502 to move the clamping cylinder rod 330 to the left to drive closing of the clamp assembly 300. When the closure of the clamp assembly 300 is complete, hydraulic fluid is then permitted to enter the locking cylinder barrel 322 where it drives the locking cylinder rod 315 upward towards the locked position. The components responsible for this fluid movement will be described in more detail below.

In FIG. 21B, hydraulic fluid is pumped into the control system 500 via the second port 55. This causes the operations described above to be reversed. First hydraulic fluid is directed to the upper part of the locking cylinder barrel 322 where it pushes the lock cylinder rod 315 down to unlock the clamp assembly 300. When unlocking of the clamp assembly 300 is complete, hydraulic fluid is permitted to enter the clamping cylinder barrel 313 where it drives the clamping cylinder rod 330 to the right towards the open position.

As indicated in FIGS. 21A-21C, the hydraulic system 500 is connectable to a high-pressure hydraulic fluid source and a low pressure drain. The high-pressure hydraulic fluid source is provided by having a pump reservoir 570 of hydraulic fluid which is pumped into a pump channel 571 with a pump 572. The low pressure drain is provided by a drain channel 581 connected to a drain reservoir 580.

The pump channel 571 and the drain channel 581 are connected to the hydraulic network in this case by a four-port, three position directional control valve 540. The three positions are "Clamping/Locking," "Steady-State Locked" and "Unlocking/Unclamping." The fluid flow directions provided by each of these three positions of the directional control valve 540 are now described below.

Attaining the Clamped and Locked Position

When the three position directional control valve 540 is moved to the clamping/locking position 541 (FIG. 21A), the pump channel 571 is connected to the first port 501 and the second port 551 is connected to the drain channel 581.

High-pressure fluid is pumped through the first port 501 from where it is connected to a channel which bifurcates into two-sub-channels: a clamp closing sub-channel 502 being connected near the right end of the clamping barrel 313 to effect closing of the clamp via retraction of the clamping cylinder rod 330, and a locking sub-channel 503 being connected to the bottom of the locking cylinder barrel 322 to effect locking via extending of the locking cylinder rod 315. It will be appreciated that, in other embodiments, the system can be reconfigured to provide closure of the clamp assembly by extending a clamping rod and/or engaging the lock may be achieved by retracting a locking rod.

In this case, the redirection of the fluid first to the clamp closing sub-channel 502 is controlled by having a locking sequence valve 510 placed between the locking cylinder barrel 322 and the first port 501 within the locking sub-channel 503. The locking sequence valve 510 in this case uses the fluid pressure in the locking sub-channel 503 for control. Therefore, fluid can only pass through the locking sequence valve 510 to effect locking when the load pressure in the locking sub-channel 503 exceeds a predetermined threshold. As the clamping cylinder rod 330 is retracting to close the clamp assembly 300, the pressure in the locking sub-channel 503 and the clamping sub-channel 502 remains relatively low. The locking sequence valve 510 remains closed so the fluid will initially flow to the clamping cylinder barrel 330 to cause the clamping assembly to close. Fluid is pushed from the other end of the clamping cylinder barrel 313 via conduit 552 and a one-way clamping bypass drain valve 522, through conduit 552 and through the second port 551 and into the drain reservoir 580. The one-way clamping bypass drain valve 522 may be considered to be a bypass check valve arranged in parallel with the unclamping sequence valve 520 which will be described below.

The pressure in sub-channel 503 builds up after the clamping cylinder rod 330 is fully pushed into its retracted position to close the clamp members of the clamping assembly 300.

Once the clamping cylinder rod 330 is fully retracted into the clamping cylinder barrel 313, pressure in the clamping sub-channel 502 and the locking sub-channel 503 will increase.

This build-up of pressure will control the locking sequence valve 510 to allow fluid flow from the first port 501 to the locking cylinder barrel 322 to effect extending of the locking cylinder rod 315 to push the lock pin 334 (not shown in FIGS. 21A-21C) into its locked position. A pressure regulator may be used in certain embodiments to limit the force applied to the locking cylinder rod.

Steady State in Clamped and Locked Position

When the clamping assembly 300 is fully closed and locked, the four-port, three position directional control valve 540 can be turned to position 542 (FIG. 21B), wherein the system 500 is no longer connected to the pump reservoir 570 and the drain reservoir 580 (ports 501 and 551 are at dead ends as shown in FIG. 21B). In order to maintain pressure in the locking cylinder barrel 322 and the clamping cylinder barrel 313, the clamping sub-channel 502 is provided with a clamping one-way valve 524 and the locking sub-channel 503 is provided with a locking one-way valve 514. These one-way valves 524 and 514 prevent hydraulic fluid from flowing out from the clamping cylinder barrel 313 and the locking cylinder barrel 322, respectively. This ensures that the clamping cylinder rod 330 remains retracted and the locking cylinder rod 315 remains extended upward. In this case, the one-way valves 524, 514 maintain pressure in the clamping cylinder barrel 313 and the locking cylinder barrel 322.

It will be appreciated that the redirection of fluid may be controlled in a different way. For example, each sub-channel may have separate directional control valves and limit switches or limit valves.

Attaining the Unlocked and Unclamped Position

To disengage the clamp assembly 300, the four-port, three position directional control valve 540 is moved to an unlock/unclamp position 543 (FIG. 21C), wherein the pump channel 571 is connected to the second port 551 and the first port 501 is connected to the drain channel 581.

High-pressure fluid is pumped through the second port 551 which bifurcates into two-sub-channels: an unclamping sub-channel 552 connected to the left end of the clamping cylinder barrel 313 to effect extending of the clamp cylinder rod 330 to open the clamp assembly 300, and an unlocking sub-channel 553 being connected to the upper end of the locking cylinder barrel 322 to cause retraction of the locking cylinder rod 315 to effect disengagement of the lock pin 334.

In this case, the redirection of the fluid first to the unlocking sub-channel 553 is controlled by the unclamping sequence valve 520 placed between the clamping cylinder barrel 313 and the second port 551 in the unclamping sub-channel 552. The unclamping sequence valve 520 uses the fluid pressure in the unclamping sub-channel 552 for control. Therefore, fluid can only pass through the unclamping sequence valve 520 to effect unclamping when the load pressure in the locking sub-channel 503 exceeds a predetermined threshold.

As the locking cylinder rod 315 retracts to disengage the lock pin 334, the pressure in the unlocking sub-channel 553 and the unclamping sub-channel 552 will be kept relatively low. Therefore, the fluid will initially flow via the unlocking sub-channel 553 to the upper part of the locking cylinder barrel to disengage the lock pin 334. With retraction of the locking cylinder rod 315, fluid is pushed out of the one-way unlocking bypass drain valve 512 and then via sub-channel 503 through the first port 501 and into the drain reservoir 580. This one-way unlocking bypass drain valve 512 may be considered to be a bypass check valve arranged in parallel with the sequence valve 510.

In this case, fluid from the locking cylinder barrel 322 is drained in a counter-flow with respect to the locking one-way valve 514. This is achieved by the locking one-way valve 514 being pilot-controlled based on the pressure in the unlocking sub-channel 553.

Once the clamp assembly 300 is unlocked, retraction of the locking cylinder rod 315 in the locking cylinder barrel 322 will cease and pressure in the unlocking sub-channel 553 and the unclamping sub-channel 552 will increase.

This build-up of pressure will control the unclamping sequence valve 520 to allow fluid flow from the second port 551 to the clamping cylinder barrel 313 to effect opening of the clamp assembly 300 as a result of extending of the clamping cylinder rod 330.

Fluid is pushed out of the clamping cylinder barrel 313 to the first port 501 and to the drain reservoir 580 through the clamping one-way valve 524. This is achieved by the clamping one-way valve 524 being pilot-controlled based on the pressure in the unclamping sub-channel 552 upstream from the unclamping sequence valve 520.

Advantages of Embodiments of the Clamp Assembly

It is to be understood that the mechanical locking features described for the three main embodiments provide the ability to keep the clamping assembly locked in the event of a hydraulic system failure.

The three main embodiments described hereinabove have lock pins oriented and moving substantially parallel with the central axis of the clamp assembly. As such they do not extend beyond the lateral edges of the clamp assembly. This allows the clamp assembly to have a relatively compact lateral profile.

The hinged clamp assembly 300 provides the advantage of being less expensive to manufacture and maintain relative to the dual cylinder clamp assembly 100 because only a single clamping cylinder, single lock cylinder and single lock pin and housing are required and because the hinge 333 of clamp assembly 300 is mechanically simple. Furthermore, the secondary lock member 350 of the hinged clamp assembly provides an additional margin of safety in the event of failure of the mechanical locking arrangement of the lock pin 334. Furthermore, clamp assembly 300 has a reduced lateral profile relative to clamp assembly 100 which requires the presence of support wings 116a,b.

The hinged clamp assembly 400 has certain advantages over the previously described clamp assembly embodiments 100 and 300 and over the prior art. One advantage is that a smaller clamping cylinder barrel 413 and rod 430 are used with extending of the rod closing the clamp assembly 400 and retracting of the rod opening the clamp assembly 400 with the reduced extent of rod leverage compensated by the clamp members 412a,b themselves. In this arrangement, the clamping cylinder barrel 413 and rod 430 have a reduced profile conforming more closely to the circumferential profile of the clamp members 412a,b. This more compact arrangement reduces the likelihood of damage from incidental contact with other equipment during installation and maintenance. Furthermore, the compact arrangement permits a clamping cylinder cover to be conveniently installed over the clamping cylinder 413 and rod 430. Such a cover (not shown) may be bolted to or integrally formed with the clamping members 412a,b. Another advantage of physically separating the association of the clamping cylinder 413 and the locking cylinder barrel 322 is that an accidental impact at the clamping cylinder 413 would not cause damage to the locking cylinder 322 and vice versa.

EQUIVALENTS AND SCOPE

The terms "one," "a," or "an" as used herein are intended to include "at least one" or "one or more," unless otherwise indicated.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs.

While this invention has been particularly shown and described with references to embodiments thereof, it will be understood by those skilled in the art that various changes in form and details may be made therein without departing from the scope of the invention encompassed by the appended claims.

The invention claimed is:

1. A hydraulic system for controlling the sequence of clamping, locking, unlocking and unclamping of a clamp assembly device for connecting a rotating control device bearing assembly to a main body of a rotating control device, the clamp assembly device comprising:
- a set of clamp members configured to retain the bearing assembly in place on the main body;
- a clamp actuator for driving clamping and unclamping of the clamp members; and
- a lock pin controlled by a lock pin actuator, the lock pin actuator configured to lock and unlock the clamp assembly device by moving the lock pin between locked and unlocked positions along an axis substantially parallel with an axis of rotation of the bearing assembly;
- wherein the clamp actuator is a clamping hydraulic cylinder acting to move the clamp members together to a clamped position and to move the clamp members apart to an open position;
- wherein the lock pin actuator is a locking hydraulic cylinder associated with a first clamp member of the clamp members; and,
- wherein the clamp members have generally aligned bores, and the locking cylinder is configured to move the lock pin into and out of the generally aligned bores;

the system comprising:
- a hydraulic network having first and second ports, the hydraulic network configured to pump hydraulic fluid into the network via the first port and direct the hydraulic fluid first to the clamping actuator to clamp the clamping members together and then to direct the hydraulic fluid to the locking actuator to lock the clamping members together, the hydraulic network further configured to pump hydraulic fluid into the network via the second port and direct the hydraulic fluid first to the locking actuator to unlock the clamping members and then to the clamping actuator to unclamp the clamping members.

2. The system of claim 1, wherein the direction of movement of the hydraulic fluid is controlled by one or more sequence valves within the hydraulic network.

3. The system according to claim 2, wherein the one or more sequence valves comprise an unclamping sequence valve in the channel providing hydraulic fluid to the clamping actuator when the clamping members are being unclamped.

4. The system according to claim 2, wherein the one or more sequence valves comprise a locking sequence valve in the channel providing hydraulic fluid to the locking hydraulic cylinder when clamping members are being locked.

5. The system according to claim 2, wherein the sequence valves are arranged in parallel with each sequence valve having a bypass check valve for reverse flow.

6. The system according to claim 1, wherein the hydraulic network comprises a clamping one-way valve to maintain clamping pressure on the clamping actuator.

7. The system according to claim 6, wherein the clamping one-way valve is a pilot controlled one-way valve configured to allow counter-flow in response to pressure being applied to unclamp the clamping members.

8. The system according to claim 1, wherein the hydraulic network comprises a locking one-way valve to maintain locking pressure on the locking actuator.

9. The system according to claim 8, wherein the locking one-way valve is a pilot controlled one-way valve configured to allow counter-flow in response to pressure being applied to unlock the clamping members.

* * * * *